(12) United States Patent
Hageman

(10) Patent No.: US 7,706,840 B2
(45) Date of Patent: Apr. 27, 2010

(54) MANIFOLD IN A RADIO BASE STATION AND METHOD OF USING SUCH A RADIO BASE STATION

(75) Inventor: Halbe Hageman, Rijen (NL)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 581 days.

(21) Appl. No.: 10/596,779

(22) PCT Filed: Dec. 24, 2003

(86) PCT No.: PCT/NL03/00934

§ 371 (c)(1),
(2), (4) Date: Jun. 23, 2006

(87) PCT Pub. No.: WO2005/062640

PCT Pub. Date: Jul. 7, 2005

(65) Prior Publication Data

US 2007/0156709 A1      Jul. 5, 2007

(51) Int. Cl.
*H04M 1/00* (2006.01)
(52) U.S. Cl. .............. 455/561; 455/424; 455/550.1; 455/560
(58) Field of Classification Search ............ 455/561
See application file for complete search history.

(56) References Cited

U.S. PATENT DOCUMENTS

| 5,159,596 | A | | 10/1992 | Itoh |
| 5,790,817 | A | * | 8/1998 | Asghar et al. ............ 710/311 |
| 6,134,229 | A | | 10/2000 | Coons et al. |
| 6,345,188 | B1 | * | 2/2002 | Keskitalo et al. .......... 455/561 |
| 6,976,021 | B2 | * | 12/2005 | Ramakrishnan ............ 707/7 |
| 2002/0064142 | A1 | * | 5/2002 | Antonio et al. ............ 370/335 |
| 2002/0123365 | A1 | * | 9/2002 | Thorson et al. ............ 455/524 |
| 2003/0008684 | A1 | * | 1/2003 | Ferris ..................... 455/561 |
| 2003/0026237 | A1 | * | 2/2003 | Mohebbi et al. ........... 370/345 |
| 2003/0200429 | A1 | * | 10/2003 | Aspegren et al. ........... 713/2 |

FOREIGN PATENT DOCUMENTS

| EP | 1 220 108 A | 7/2002 |
| WO | WO 00/28754 A | 5/2000 |
| WO | WO 01/56235 A | 8/2001 |

\* cited by examiner

*Primary Examiner*—Lester Kincaid
*Assistant Examiner*—Isaak R Jama

(57) ABSTRACT

A radio base station has a monitor (31), memory (33, 49) and one or more resources (35(*i*), 37(*j*), 39(*k*), 41(*m*), 43(*n*), 45(*o*), 47(*p*)). The memory (33, 49) is connected to the monitor (31) and stores tasks and data. Each of the resources (35(*i*), 37(*j*), 39(*k*), 41(*m*), 43(*n*), 45(*o*), 47(*p*)) is connected to the monitor (31) and performs a function or executes a program. The radio base station has an analogue signal manifold (39(*k*)) with input lines, output lines, and nodes for making connections between input and output lines. The input lines and output lines are connectable to predetermined resources and the nodes may perform a mathematic operation on an incoming signal on the input lines.

22 Claims, 16 Drawing Sheets

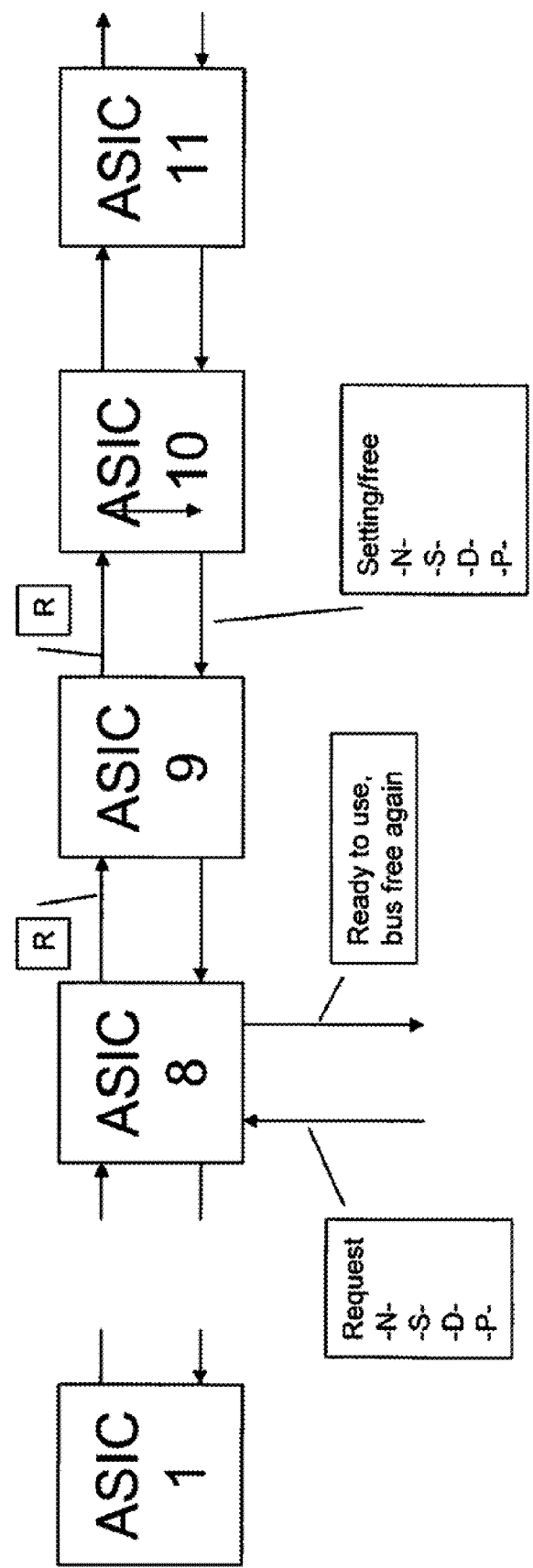

MANIFOLD IN A RADIO BASE STATION AND METHOD OF USING SUCH A RADIO BASE STATION

BACKGROUND OF THE INVENTION

The present invention relates to improvements in radio base systems. Whereas the present application is directed to connections between components in radio base stations, other aspects of the invention are claimed in co-pending applications:
1. XML controlled radio base station and method of using such a radio base station U.S. Pat. application Ser. No. 10/584,363 filed on Mar. 9, 2007
2. System with centralized resource manager is a PCT Application Number PCT/NL2003/000932 filed on Dec. 24, 2003
3. Multisectional bus in radio base station and method of using such a radio base station is a U.S. Pat. No. 7,624,220 filed on Mar. 5, 2007

PRIOR ART AND PROBLEMS

Radio Base Stations (RBS) within a mobile telephony system, apart from being arranged to communicate with mobile terminals, are often used as network traffic transfer points to other base stations. Commonly used network topologies for connecting such base stations to each other include chain, ring, and tree topologies. A single transmission link may operate at rates of 2, 4, or 8 Mbit/sec, which is greater than what is used by a single base station. Therefore, multiple base stations often use a single transmission link. Since the physical transmission medium is usually a radio link, base station sites often house radio link equipment as well.

Each base station is typically connected to the transmission network with one or more physical transmission links. The number of links depends on the desired network topology, requirements for redundancy, and the need for transmission capacity at the base station.

FIG. 1 shows an example of a RBS 1 according to the prior art (see, e.g., WO01/56235). The RBS 1 as shown comprises a switch 5 that is connected to a plurality of transceivers TRX 29 via internal interface connections 27. The internal interface connections 27 are connected to an internal interface 23. An external interface 21 is connected to ports 3, 7, 25 for external connections. The external interface 21 is also connected to an internal bus 19. The internal bus 19 is also connected to a plurality of digital signal processors DSP 17, memory units 13, and a central processing unit CPU 12.

The external interface 21, the internal interface 23, the digital signal processors DSP 17, some of the memories and part of the internal bus may be grouped together on a single integrated circuit 9. The central processing unit CPU 12 may be implemented on a single integrated circuit 11. A separate memory unit 14 may be provided for use by the CPU 12 and may be implemented on a separate integrated circuit 15.

For further details as to the operation of the RBS 1 according to FIG. 1, reference is made to WO01/56235.

In the prior art, the resources present in the radio base station are hardwired in configurations related to certain functions. These functions are not continuously used. Result is that the radio base station requires more components than necessary and/or is less flexible in adapting to new functions.

SUMMARY OF THE INVENTION

The object of the present invention is to provide a radio base station that is more flexible.

To obtain this object, the present invention provides a radio base station comprising a monitor, memory and one or more resources, said memory being connected to the monitor and arranged for storing tasks and data, each of said resources being connected to the monitor and arranged for at least one of performing a function and executing a program, wherein the radio base station comprises at least one analogue signal manifold comprising input lines, output lines, and nodes for making connections between input and output lines, said input lines and output lines being connectable to predetermined resources and said nodes being arranged to perform at least a mathematic operation on an incoming signal on the input lines.

Thus, in the invention all hardwired connections between components run via a single manifold allowing to connect several types of resources in parallel in a flexible way depending on certain functions. Here, a manifold is defined as a connection station comprising nodes between input and output lines and arranged to perform mathematic operations on incoming signals on the input lines. Mathematic operations may also be performed on signals on the output lines.

In an embodiment, the invention relates to a method of operating a radio base station comprising a monitor, memory, one or more resources and at least one analogue signal manifold, said memory being connected to the monitor and storing tasks and data, each of said resources being connected to the monitor, said at least one analogue signal manifold comprising input lines, output lines, and nodes for making connections between input and output lines, said input lines and output lines being connectable to predetermined resources, said method comprising:
  at least one of performing a function and executing a program by said resources,
  reading one or more tasks from said memory,
  checking whether resources required for performing said one or more tasks are available and
  sending commands to selected resources specifying the task to be performed;
  connecting one or more input lines with one or more output lines of the analogue signal manifold by means of said nodes and performing at least a mathematic operation on an incoming signal on the input lines in said nodes.

In a further embodiment, the invention relates to a computer program product storing instructions and data to be loaded by a radio base station comprising a monitor, memory, one or more resources and at least one analogue signal manifold, said memory being connected to the monitor and storing tasks and data, each of said resources being connected to the monitor, said at least one analogue signal manifold comprising input lines, output lines, and nodes for making connections between input and output lines, said input lines and output lines being connectable to predetermined resources, said computer program product, after being loaded, allowing said monitor to:
  read one or more tasks from said memory,
  check whether resources required for performing said one or more tasks are available and
  send commands to selected resources specifying the task to be performed.
  send a command to said analogue signal manifold to connect one or more input lines with one or more output lines and to perform at least a mathematic operation on an incoming signal on one or more input lines.

Finally, the invention relates to a data carrier comprising such a computer program product.

BRIEF DESCRIPTION OF THE DRAWINGS

The invention will be explained in detail with reference to a plurality of drawings that are only intended to illustrate the present invention and not to limit its scope. The scope of the invention is only limited by the annexed claims and their technical equivalents.

FIG. 17 shows a block diagram to illustrate a bus negotiation principle;

DETAILED DESCRIPTION OF THE INVENTION

I. General Setup of Radio Base Station.

In a first aspect the invention relates to a general setup of a radio base station RBS.

Figure 1:
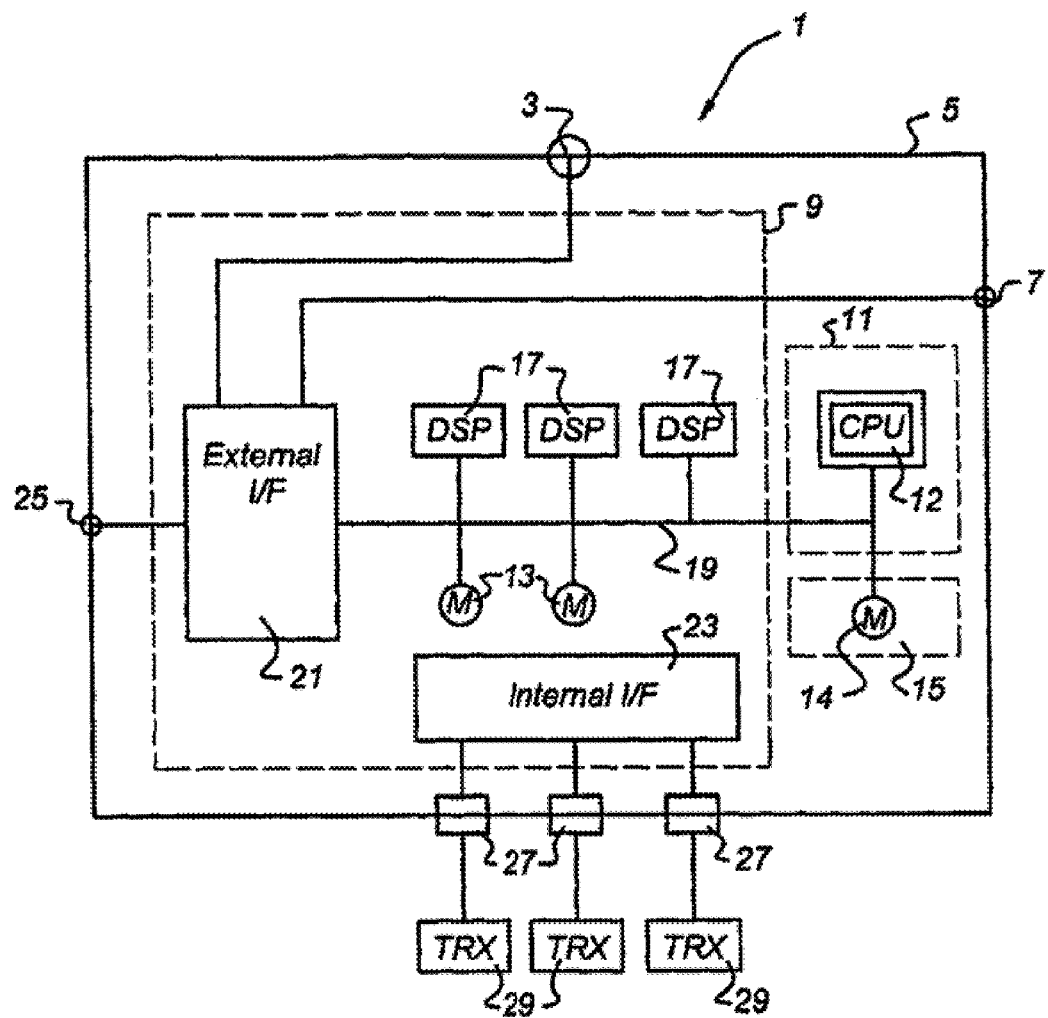
FIG. 1 shows a radio base station (RBS) according to the prior art.
Figure 2:
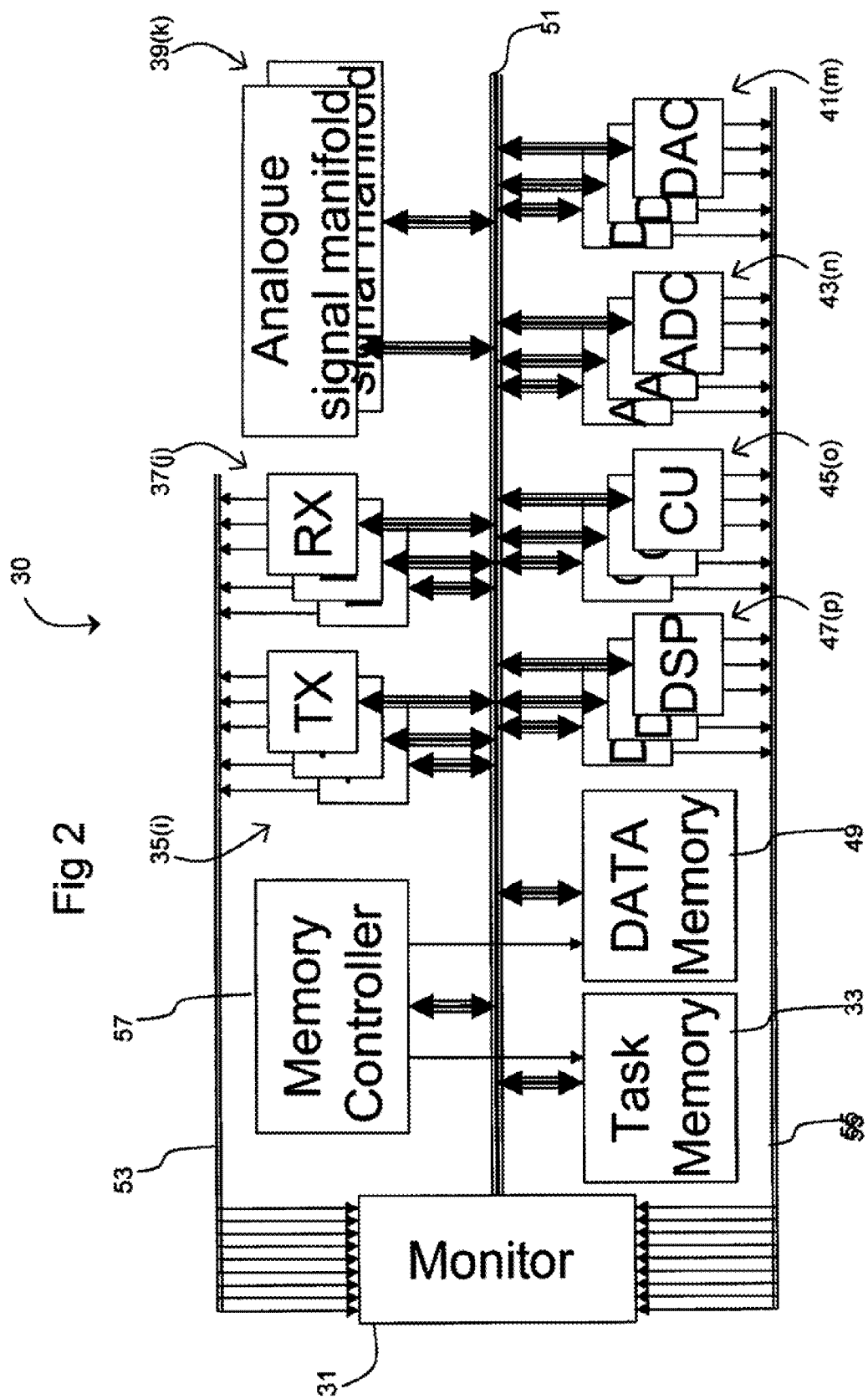
FIG. 2 shows some main features of a RBS according to the invention.

FIG. 2 shows some main components of a radio base station RBS 30. The RBS 30 comprises a monitor 31, i.e., a processor performing predetermined tasks under instructions from a suitable software program loaded in a suitable memory. The monitor 31 is connected to a bus 51. Other components connected to the bus 51 are: a memory controller 57, one or more task memories 33, one or more transmitters TX 35($i$), i=1, 2, . . . , I, one or more receivers RX 37($j$), j=1, 2, . . . , J, one or more analogue signal "manifolds" 39($k$), k=1, 2, . . . , K, one or more digital analogue converters DAC 41($m$), m=1, 2, . . . , M, one or more analogue digital converters ADC 43($n$), n=1, 2, . . . , N, one or more control units CU 45($o$), o=1, 2, . . . , O, one or more digital signal processors DSP 47($p$), p=1, 2, . . . , P, and one or more data memories 49. The memory controller 57 is connected to both task memory 33 and data memory 49 for controlling read and write operations. The memories 49 and 33 may be implemented in any way known to persons skilled in the art, e.g., on a hard disk or on the same integrated circuit but may also be physically separated.

It is observed that a "manifold" may be defined as a connection station comprising nodes between input and output lines, which nodes are arranged to perform mathematic operations on incoming signals on the input lines. Its operation will be explained in detail hereinafter with reference to FIGS. 7, 8.

All components shown in FIG. 2, apart from the monitor 31 itself, are resource elements to the monitor 31.

Before going into detail, first of all, a brief explanation of the operation of the RBS 30 is given.

The tasks of RBS 30 are contained in the task memory 33. Task memory 33 is preferably a non-volatile memory storing the tasks which are preferably defined in XML (EXtensible Markup Language). XML uses a tag structure for defining, e.g., data elements on Web pages and business-to-business documents. It's main feature is that it defines what these elements contain. So, in the context of this invention, "XML" will be used as a reference to a language using tags with content of data elements.

The monitor 31 receives triggers from all resource elements, i.e., TXs 35($i$), RXs 37($j$), DACs 41($m$), ADCs 43($n$), CUs 45($o$), DSPs 47($p$), via bus 51. Data memory 49 and manifolds 39($k$) do not provide triggers as they are merely set for a function but not actually execute a program.

Here, "triggers" are distinct signals that are continuous, rather than pulse shaped. Apart from sending triggers, resources may send a status word upon receiving a status request command from monitor 31.

The monitor 31 constantly acts on triggers and determines if a new task needs to be started. If so the monitor 31 reads the XML defined task from task memory 33 and checks whether the resources elements required for performing that task are available. For this a resource table is contained in the data memory 49 containing the current status (occupied or free) and characteristic for each available resource element.

If all resource elements are available then the resource elements are locked (set occupied) in the resource table in data memory 49. Then each resource element gets its instruction via the bus 51 containing the location of its specific code and settings within the task and the start location of the data area concerned. The instructions (commands) are within the defined tasks and are transmitted by the monitor 31 to the resource. The DSPs are exception in the sense that they retrieve code blocks directly from memory. This could also apply to the resources containing a processor arranged to perform task dependent code (e.g., a CU 45($o$) comprising a general purpose processor). In some tasks, data blocks are needed. Then, the resource retrieves these data blocks from memory and store them after use, if necessary. These data blocks may come from RAM, that comprises dynamic data, or ROM, that comprises static data like defaults (cf. FIG. 3).

Preferably, the monitor 31 acts as a multiple state sequencer meaning that it may handle multiple sequences of tasks in parallel. Stepping through the sequence is based on the triggers and status received from assigned resource elements. For this, the monitor 31 with the assignment of the resource element also internally routes the triggers of the resources to the correct sequencer handling the chain of tasks. The selection of a next task to be selected and assigned based on incoming triggers, is contained in the XML definition.

The monitor 31 writes command blocks to all resources, specifying the task to be performed. Only some resources (like a DSP 47($p$)) will need to read own code before actual execution of the assigned task may start.

A specific resource is the manifold $39(k)$. In one embodiment, one HF (High Frequency) manifold is foreseen combining all possible routings between HF components like DACs $41(m)$, TXs $35(i)$, ADCs $43(n)$, RXs $37(j)$ and signal generators (not shown; e.g., necessary to generate signals with an intermediate frequency in GSM systems as is known to persons skilled in the art). The manifold $39(k)$ includes simple operations like adding, subtracting or multiplication of analogue signals, as will be explained below.

The bus 51 is, preferably, a multiple 16/32/64/128/256 bit architecture based on the datagram principle (a datagram is the unit of data, or packet, transmitted in a TCP/IP network. Datagrams contain source and destination addresses and data). In an embodiment, the bus capacity of bus 51 is dividable in smaller units so that multiple communications may be done via the same bus 51. The bus 51 may include also the features of section isolation and section crossover which also contribute to a high effective throughput. The features of bus 51 will be explained in detail with reference to FIGS. 9-15.

Below, several aspects of the present invention will be explained in detail.

I.1 Memory Control.

Memory control related to both non-volatile task memory 53 and data memory 49 is slightly different from what is ordinary used in computers. The central bus system based on bus 51 and hence the architecture is built on the datagram principle. Meaning there is only a write operation from a source towards a destination possible. A resource element needs to request a portion of memory content from data memory 49 (or task memory 33) to be transmitted. The memory controller 57 acts on this request by transmitting in his turn as source a datagram back to the requesting resource element containing the data as stored in data memory 49. Memories 33, 49 themselves are very specific types of resource elements. The whole memories 33, 49 are divided in sectors. Basically the system is identical to floppy or hard disk system. In fact, any combination of hard disk, ROM, RAM etc. may be used to form the 2 memories 33, 49. The memory controller 57 of the memories takes care of sector read/write. The "ROM" part is considered to be hard disk or EEPROM or the like allowing remote upgrading. A block of data may contain any number of sectors not necessarily consecutive. For each block an identifier, length, and sector list is contained in the data block list. Not used sectors are combined to one block having as each block an identifier, length and sector list. The sector is also the minimum size in data transport. Read request or write block is always for N sectors. The data block list is dynamic in size and is controlled by the memory controller 57 (as the rest of the resource allocation table is controlled by monitor 31). Thus, memory is a resource and the data block list 65 is an exception to the resource allocation table 63

Preparation of dynamic data blocks is done by the monitor 31 like preparation of any other resource element. Tasks that require memory need to mention block size as resource requirement. Requested memory blocks are not always considered to survive the task. If a requested dynamic data block is to survive a task, a higher order requester, like a state machine, must request the data block. The reason is that there is no real stack mechanism and other tasks and state machines can not be recurrent or multi-threaded. Therefore, dynamic data blocks are not so much associated with their task or state machine but rather with a sequence number of their instance. Inter task usage is temporary stored in DSP memory (not shown) contained in the DSPs $47(p)$.

Figure 3:
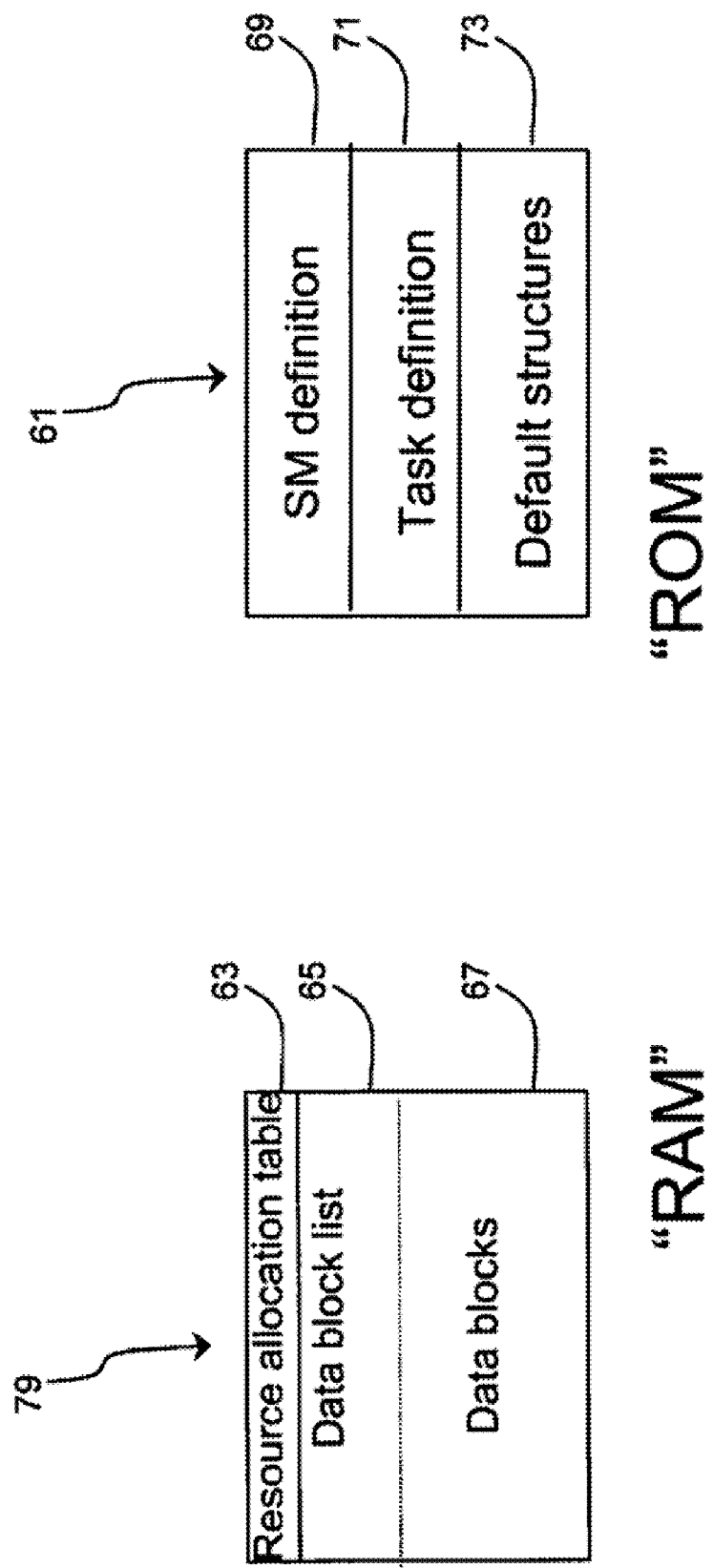
FIG. 3 shows examples of memory contents.

The basic elements contained in both task memory 33 and data memory 49 are shown in FIG. 3. FIG. 3 shows a RAM portion 59 and a ROM portion 61 of memories 33, 49. The RAM portion 59 comprises a resource allocation table 63, a data block list 65, and data blocks 67. The ROM portion comprises a SM (=State Machine) definition 69, a task definition 71, and default structures 73.

The resource allocation table 63 contains an entry for each resource element, comprising resource element ID (identical to, e.g., the bus ID of bus 51), the status (free/occupied) of the resource element, and a parameter list identifying key characteristics of the resource elements (if required for selecting between resource elements which have not identical capabilities). The resource allocation table 63 is at start-up of the RBS 30 read from the default structures 73 and is maintained by the monitor 31.

The data block list 65 contains an entry for each data block of "ROM" or "RAM" (also data block list 65 itself). Each entry comprises: a data block ID, length in sectors occupied by a data block and a sector list. An initial data block list 65 is read from the default structures 73 at startup and is maintained by the memory controller 57.

The SM definitions 69 contains various state machine definitions. Each SM definition is a data block as defined before. The SM definition is a list of state machine steps, each step comprising a current state, decision mask and a next state. State is the identifier for a lower level state machine or a task. The decision mask is used to select certain bits from a trigger received from a requesting resource element.

The default structures 73 contain structures like an initial resource table, an initial data block list, code sections for DSP's $47(p)$ and other data structures that are fixed and need to be accessed as separate block during operation of the RBS 30.

The task definition 71 contains the various tasks, each task being a data block as defined before. Each task comprises: a priority indicator, a resource list, a list of requested dynamic data blocks and a trigger specification list.

The priority indicator indicates a predetermined level of priority related to the real time importance of the task to be performed The resource list contains per resource element: type, characteristics, command blocks for start, state and stop, and code block identifier. Not all elements are always present depending on the resource element type. The command block is dynamically adjusted by the monitor based on allocated resources. Example: the ID of the DAC the output of the DSP has to be sent to.

The list of requested dynamic data blocks contains per requested data block a data block identifier and a size of the data block in sectors.

The trigger specification list contains a trigger identifier for each trigger. The sequence in the list also specifies the layout of a trigger word for the monitor 31. Trigger words are assembled by the monitor 31, as will be explained below. The monitor 31 adapts the specification with specifics of the assigned resource elements. An example is: the ID of an assigned DSP $47(p)$ is added by monitor 31 as the trigger identifier mentions only "PROGRAM READY DSP". Monitor 31 will use trigger "PROGRAM READY DSP 4".

I.2 Monitor.

Figure 4:
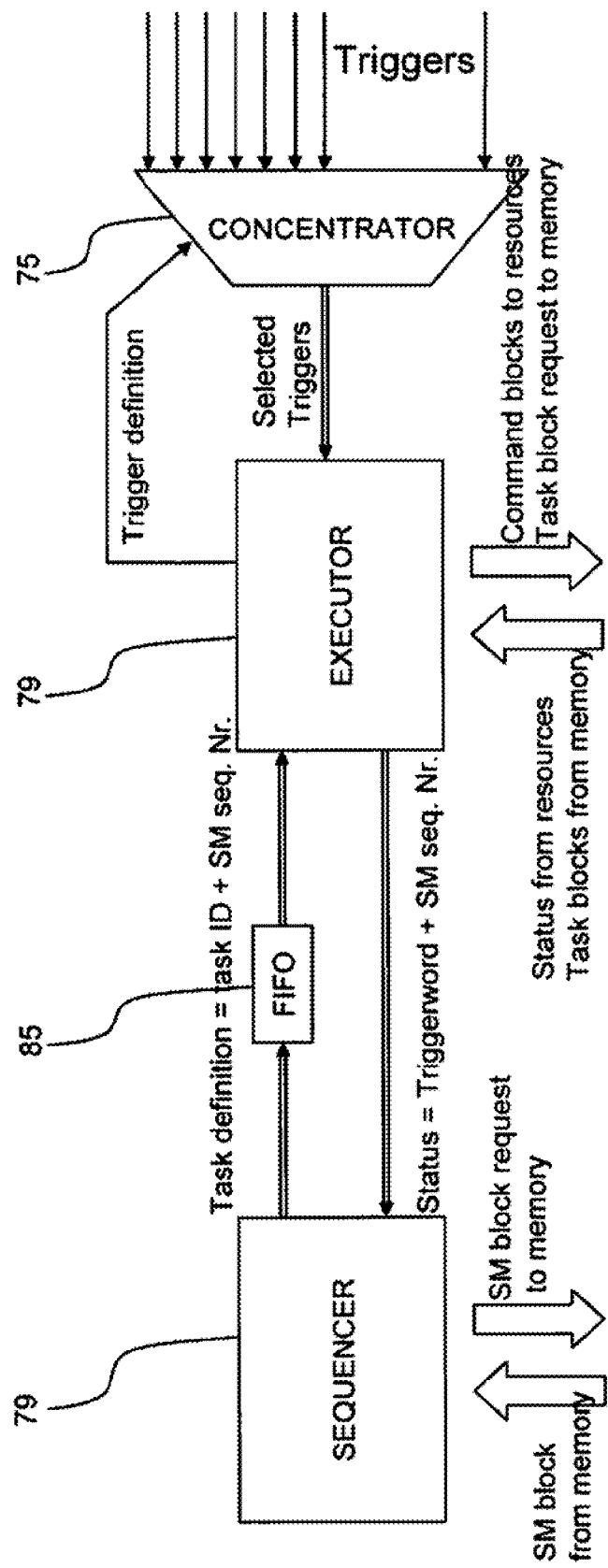
FIG. 4 shows a block diagram of an example of a monitor.

As shown in FIG. 4, the monitor 31 is build up with 3 parts: concentrator 75, sequencer 79 and executor 77. A FIFO (First In First Out) memory 81 for buffering tasks to be started, sent by the sequencer 79 to the executor 77, is provided between sequencer 79 and executor 77.

The sequencer 79 is the core part. It handles several state machines in parallel. Each state machine has a table stored in memory with current state (C), next state (N) and trigger mask (TM) value (cf. FIG. 5). The sequencer 79 continuously scans each state machine comparing current state and the value of the trigger word as received from the executor 77 with the occurrences of current state and trigger mask in the table. If a match is found the next state becomes the current state; else the current one is maintained. A next state is either a task or is again a state machine. In the latter case the sequencer 79 will retrieve the corresponding state machine definition 69 from ROM portion 61 by sending a SM block request for the specific state machine to ROM portion 61. The ROM portion 61 provides the SM block in return. If it is a task then the start up of the task, i.e. a task ID (name) and a SM sequence number, is forwarded by the sequencer 79 to the executor 77. Then, the executor 77 reads a task definition 71 from ROM portion 69 via transmission of a task definition request. The executor 77 assigns resource elements in line with the task definition in the task block received from ROM portion 61. If not all required resource elements are available the task concerned is suspended till the required resource elements are available. The executor 77 starts the resource elements by issuing a command block to each resource element. For most resource elements, the command block is enough to work with because the command block contains all required information for the resource to perform his actions as part of the total task. Some resource elements like the DSP's 47($p$) need to retrieve, after reception of the command block, the task specific executable image from the memory. The resource issues a block read request to the memory identifying the required code section as specified in the command block to the resource. The received code section from the memory is placed in the resource own local memory (these local memories are not shown in the figures). In case the resource has the code section still available in his local memory (not shown) the request for the code section is omitted. (The reason not to put the code sections in the command is because a sector is the unit of transport on the bus 51. One command always occupies only one sector whereas code sections are, in general, larger than one sector). The executor 77 maintains the resource allocation table 63 in RAM portion 59 but the actual reading and writing of memory content is done by memory controller 57. I.e., content of memories 33, 49 may be requested by the executor 77 but control is done by the memory controller 57.

Each task comprises a trigger word definition determining how a trigger word is to be assembled from different signals and components in status words. To assemble a trigger word, a portion related to these signals is sent to the concentrator 75 which portion is then extended by parts of the status words. The result is a fixed length trigger word. The executor 77 does not act on the trigger word but on the different trigger signals, whereas the sequencer 79 acts on trigger words.

The trigger word may obtain triggers from resource elements that are run time determined. There are different types of triggers, among which: a started trigger indicating that a resource has started performing its part of a task, a completion trigger used by a resource element to indicate that its (part of the) task is completed and the resource element is ready to perform a next task, an exemption trigger indicating that an exceptional situation has occurred, like a RX reception level below a threshold or a mobile station became outside range of radio base station.

After receiving a trigger, the executor 77 determines a specific trigger signal in the correct format during resource element assignment as explained above (e.g., the DSP to be used is expressly indicated). Also, after having assigned resource elements, the executor 77 receives and uses trigger signals from assigned resource elements. E.g., after having received a ready trigger signal from a resource element the executor 77 may give them free again. Some resource elements like the manifolds 39($k$) do not generate and send a ready trigger signal. They will receive a termination command from the executor 77 after all resource elements assigned to perform a task have sent ready triggers to the executor 77. Then, after having received such a termination command such resource elements are free to perform another task.

I.3 Monitor Sequencer.

Figure 5:
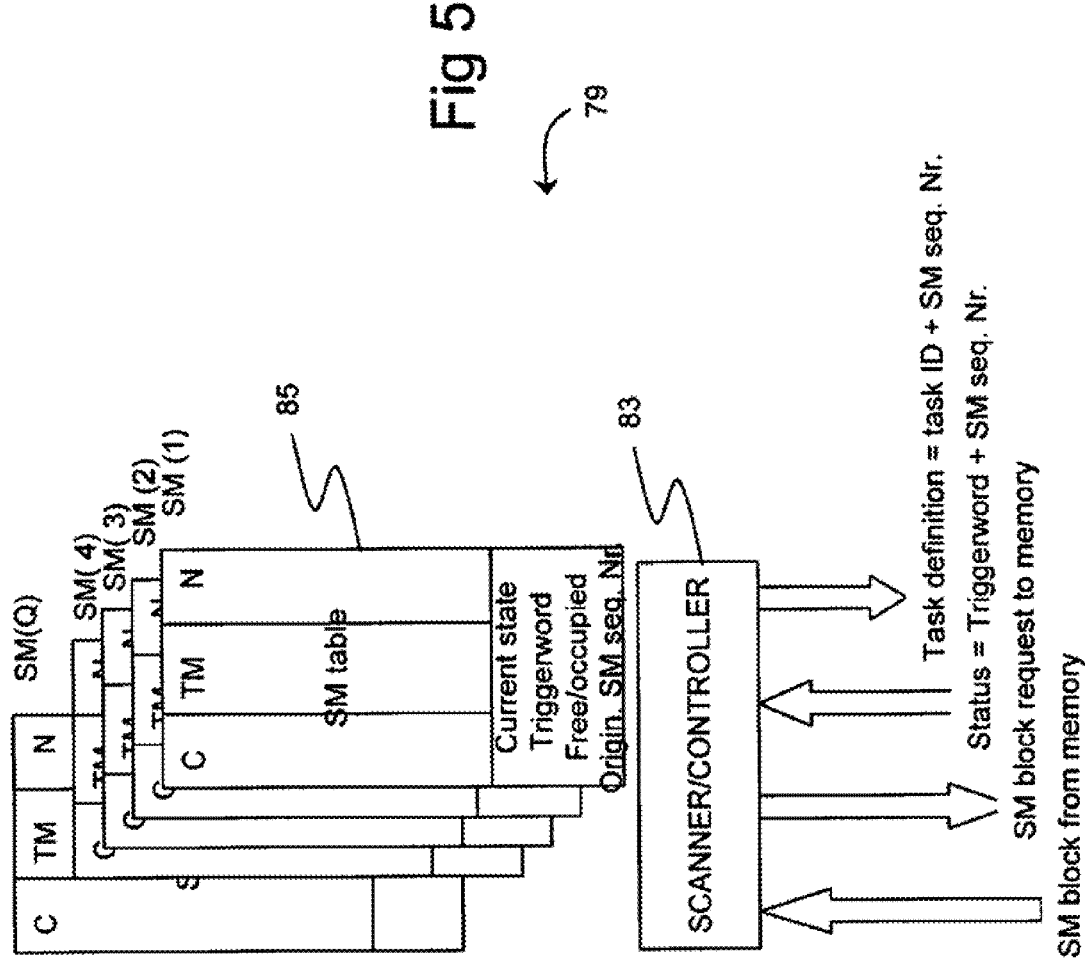
FIG. 5 shows a block diagram of an example of a monitor scheduler.

As shown in FIG. 5, the sequencer 79 comprises a processing unit called "scanner/controller" 83 and memory 85. The memory 85 comprises several fields each storing a state machine SM(q), q=1, 2, 3, ..., Q. Each state machine SM(q) is a SM table comprising three columns: a column C comprising the current state., a column TM comprising the trigger mask, and a column N comprising the next state. This table defines the possible state transitions of the state machine. Moreover, each state machine SM(q) comprises the following data elements:

current state, indicating the state that is currently the active state for this state machine;

trigger word, indicating a composition of triggers and status as received from the executor 77 and associated with a task of the present state machine SM(q);

free/occupied, indicating whether the state machine SM(q) is free or occupied;

originating SM sequence number, indicating the parent state machine sequence number responsible for the start of this state machine.

The scanner/controller 83 is arranged to send task start definitions, comprising a task ID and the sequence number of the related state machine to the executor 77, and to receive a trigger word from the executor 77 in return when the task is completed. Moreover, the sequencer 79 is arranged to send SM block requests to ROM portion 61, and to receive SM blocks from ROM 61 in return.

At startup an initial SM(1) is loaded at a first position in memory 85. The scanner/controller 83 reads the SM definition from memory portion 61 by issuing a SM block request. This SM definition determines the basic functions and is continuously running and scanning for actions to be taken. The sequencer 79 loads the received SM definition in its memory 85. When loading the free/occupied field is set to "occupied" but the originating SM sequence number is set to 1 being the own (first) state machine. This is only valid for the first SM(1). All other state machines SM(2, 3, ...) will get a real originating SM sequence number.

The start state of a SM is defined by the first state transition definition in the state transition table, characterised by a blank current state field and no trigger mask value. The SM(q) starts with the next state defined in this state transition definition. The state is actually a name equal to the identification of a SM(q) or task, starting with "SM" (=state machine) or "T" (=task) to allow the scanner/controller 83 to perform the required operation.

When a state is a task, the ID of the task (=state name) and the SM sequence number are sent to the executor 77 via the task definition. The trigger word for the SM(q) is cleared in memory 85. When a task is completed, the executor 77 returns a trigger word assembled according to the definition in the task. This trigger word and the SM sequence number belonging to the task are received by scanner/controller 83. The scanner/controller 83, then, puts the received trigger word in the related trigger word field of that SM(q). Only if a new task is started, the trigger word is reset. The trigger word is not reset but overwritten if a return from a lower level state machine occurs. Then, the trigger word of the last executed task of the lower level state machine is used for such overwriting.

The scanner/controller 83 checks one by one the free/occupied indicator of the state machines SM(q). If free, the next position (next state machine) is taken. When occupied, the scanner will compare the trigger word with the trigger mask TM for each state transition in the table where the current state field is equal to the actual current state as stored for that state machine SM(q). If trigger mask TM and trigger word give a match the state in the next state column N for that state transition definition is the new current state. This next state N is loaded in the current state field, the trigger word is cleared and a task start request is sent to the executor 77 or an other SM(q) is loaded on the next "free" position in memory 85. When a state machine SM(q) is finite it has at least one state transition definition (current state, trigger mask, next state) in which the next state is blank. The free/occupied field is set to "free" so the scanner will not access the state machine anymore. The trigger word available is copied to the originating state machine number and may there be used for determining the next state N.

I.4 Monitor Executor.

Figure 6:
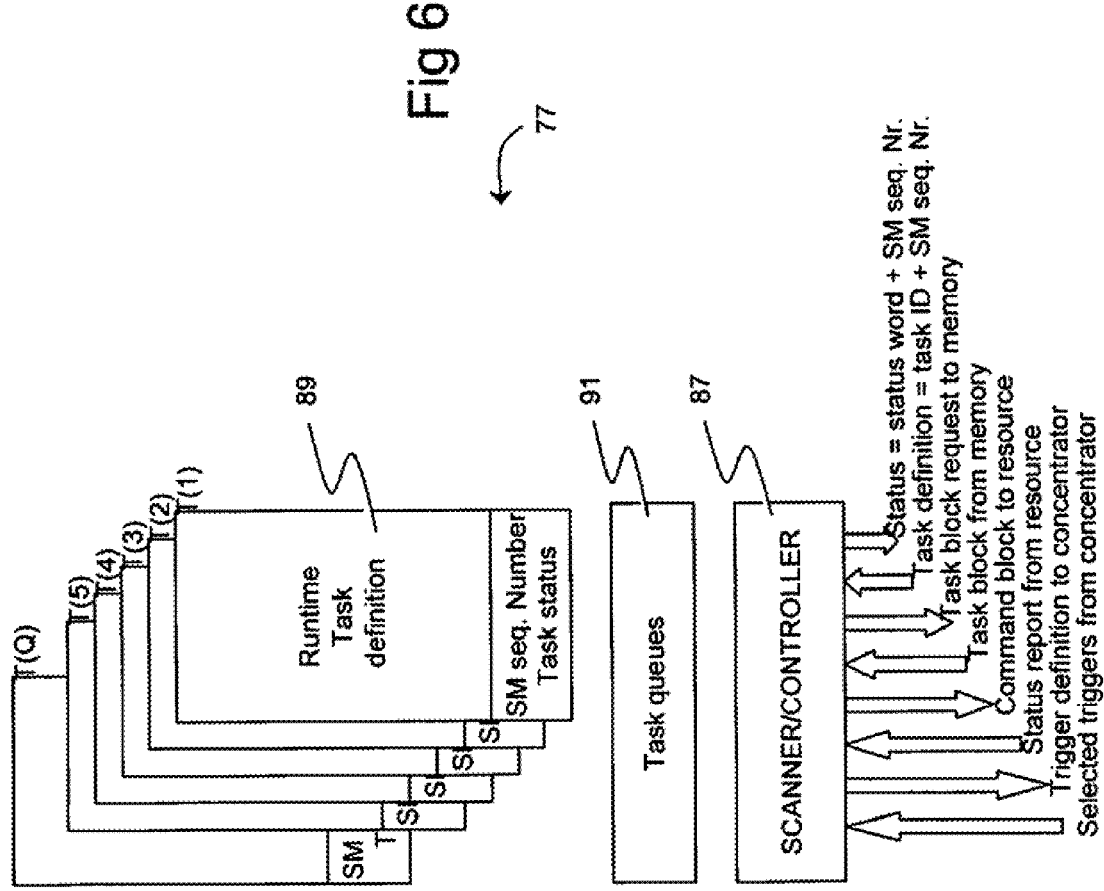
FIG. 6 shows a block diagram of an example of a monitor executor.

As shown in FIG. 6, the executor 77 comprises a scanner/controller 87 and a memory 89. The memory 89 comprises runtime task definitions T(q), q=1, 2, . . . , Q. Each runtime task definition comprises a SM sequence number and a task status. Moreover, FIG. 6 shows that executor 77 has a memory portion 91 storing possible task queues comprising field numbers q that are references to tasks waiting to be performed. Each task queue relates to an other priority level. Tasks identified by their field number q in one task queue have the same priority level.

The executor 77 has Q fields to load a task. When a task execution request is received from the sequencer 79 by scanner/controller 87 the scanner/controller 87 will issue a task block request to ROM 61. ROM 61 will send the requested task block to the scanner/controller 77. When the task block is received the scanner/controller 87 stores it in the first not occupied field in memory 89. I.e., scanner/controller searches the first field having task status "free". The SM sequence number as received from the sequencer 79 is stored at the correct task position and the task status concerned is set to "scheduled".

The task definition as stored in memory 89 comprises, among others, an indication of a priority level. Each priority level corresponds with one of the task queues. The scanner/controller 87 places the field number q of the task concerned at the end of the queue of field numbers already waiting in the task queue corresponding with the priority level concerned. The task is now included in the scanning process, i.e., in the process in which the scanner/controller 87 scans the task queues 91 for field numbers q of tasks waiting to be performed.

When the scanner/controller 87 scans the task queues 91, which it does in the order of priority level, it is referred to a task by means of the field number q. Then, it reads the task status of the task concerned from memory 89.

When the task status is "scheduled" the scanner/controller 87 checks the resource definitions indicating which (kind of) resources are required for the task concerned and which are identified in the runtime task definition. Then, the scanner/controller checks in the resource allocation table 63 (FIG. 3) if these (kind of) resources are available. If all these (kind of) resources may be made available the resources are locked for this task in the resource allocation table 63. The scanner/controller is informed which specific ones of the resources are locked.

Also, the dynamic data blocks are ordered to the memory controller 57. As explained earlier, some of the resource definitions may refer to a generic stated resource kind, e.g., "DSP" instead of DSP4. The scanner/controller 87 modifies the generic stated resource definitions in the task definition in memory 89 to actual resource definitions in accordance with the information received from the resource allocation table 63. Then, start command blocks are sent to the specific resources and the task status in memory 89 is set to "started".

The scanner/controller 87 continues with the next task as referred to in the task queue with the same priority level. If that queue is done it turns to the following task queue having a next lower priority. After the last task with lowest priority has been scanned the scanner/controller 87 starts scanning anew with the task queue having the highest priority. When the scanner reaches the task again it reads the trigger specification and forwards it to the concentrator 75. The concentrator 75 replies by sending selected triggers and the executor 77 compares the received selected triggers with the mask in the trigger definition. When the comparison made by the executor 77 does not result in task "completed" the scanner/controller 87 continues with the next task. However, if the result shows that the task is "completed", then, the scanner/controller 87 issues the status command blocks including the task field number q to resources involved in performing the task. As a consequence, the resources reply with sending a status block including the task field number q to the monitor 31.

The scanner/controller 87 sets the task status in the runtime task definition to "ready" and continuous with the next task as indicated in the task queues.

The status replies from the resources in reply to the status command blocks are received by the scanner/controller 87 and are placed in the runtime task definition identified by the field number q returned in the status replies and on the correct location identified by the resource ID.

The next time, when the scanner/controller 87 reaches this task again in the task queues, it finds the task status "ready" and checks on status replies in the runtime task definition 89. If all replies are in the runtime task definition 89 the scanner/controller 87 will assemble a trigger word according to the trigger word specification in the runtime task definition 89, and send it to the sequencer 79 with the SM sequence number. This trigger word is a fixed length bit pattern build up by the value of trigger signals en (parts) of the status replies, as defined by the trigger word specification in the runtime task definition 89. The scanner/controller 87 generates and issues termination commands to the resources involved in performing the task concerned and sets the resources to "free" again in the resource allocation table 63 (FIG. 3).

Last item is to set the task status of the task concerned in memory 89 to "free" and remove the field number from the task queue.

In order to ease operation for the scanner/controller, in an embodiment, the free task field numbers q are stored in a separate queue (not shown). The scanner/controller 87 puts free field numbers back in that queue and the scanner/controller 87 puts them in one of the task queues when loading a new task.

II. XML Implementation.

In a second aspect, the invention relates to programming languages in radio base stations. Current programming in radio base stations RBSs is either in low level machine code or by means of a higher order programming language. The first is rather complex and the failure density is commonly high. Programming languages have the advantage that the failure density becomes less and, thus, may solve that problem. On the other hand, then, additional steps are required as compiling, linking and loading to get an executable image. None of these do fit directly for the dynamics of runtime assignment of resources. Specially the fact that the monitor system must be able to recognize the program in order to modify for the runtime resource assignment. An other factor is that the program must fit to a series of different versions of radio base stations having in general the same resource types but in which the number and capacity of resources may differ.

Therefore, in an embodiment, the invention is directed to using XML. Predefined structures in the form of Document Template Definitions (=DTDs) give the low failure density as for programming languages and in the same time provide a structure that allows system components like the monitor 31 or memory controller 57 to identify components and to alter them runtime. The XML defined bricks created by using the DTDs, build-up the total program but are also the source for well readable graphic documents that further help in maintainability and reduction of failure density of the program. The interactive development cycle becomes less time consuming as no compiling, linking and loader creation is required. The XML code bricks are stored directly in the radio base station 30 concerned and the developer does not need to know the specifics of the resources available in that radio base station 30.

For further explanation, a difference is made for the XML implementation issues and that of the XML programming environment. The programming environment issues will only be discussed when related to the implementation issues. The whole programming environment will not be discussed here. Secondly, it is not the intention of the XML implementation to discuss in detail the functions of a GSM or UMTS radio base station or other implementation of the XDR (=XML Defined Radio, i.e, the basestation as used here). Developers of these systems are well acquainted with these implementation and the description here is only intended to help them understand the XML part of the XDR well enough to build and use it for their specific application.

Hereinafter, the following items will be discussed:
Structure definition (general)
Block list (a first specific instance of a structure definition)
Resource table (second specific instance of a structure definition)
State machine definition
Task definition
In the XML implementation some general syntax is used:
<xxxxxxx> literal,
XXXXXX example value
? One or none,
* one or more,
+ none or more,
element defined in programming environment

II.1 XML Structure Definition in General.

The structure definitions are specific blocks as explained in the memory control part. The general structure is simple and is given below together with the DTD and XML view. The XML view is an instance created with the DTD.

```
STRUCTUREDEFINITION.DTD
<!ELEMENT structuredefinition (structurename, structureblock)>
<!ELEMENT structurename (# BLOCKNAME)>
<!ELEMENT structureblock (# TEXT)>
BLOCKLIST.XML
<structuredefinition>
    <structurename> blocklist </structurename>
    <structureblock>
    "Contents of block in text"
    </structureblock>
</structuredefinition>
```

The DTD is the definition that is used for the system resources for parsing the .XML. The .XML is contained in the XDR memory as given in the instance above. In the programming environment, the DTD defines the creation of .XML instances.

Examples of the block contents are:
a piece of machine code being a specific routine like for a DSP 47(*p*), given that the machine code is represented in 8 bit alphanumerical characters,
a data layout structure with default values, with the same restriction as for the DSP code block
a list or table used by the radio base station 30 for own administration purposes.

Two examples of structure definitions will be discussed in more detail, i.e., the BLOCKLIST and the RESOURCETABLE. Both examples have a general structure as in the structure definition DTD but they have a child ".DTD" that defines additional elements.

II.2 XML, Example: Block List Definition.

Each XML brick created with a DTD corresponds with a data block as used in the XDR system. Each data block has a specific name. The list of all data block names is the first element in the program. It is used in 2 ways.

Firstly, it is used for programming. By the nature of XML, it is possible to limit the usage of parameters (like the reference to a block name) to a predefined list.

Secondly, it is used as runtime start-up. The memory controller 57 at start-up of the radio base station 30 reads an initial block list from the default structures 73 in ROM 61 (FIG. 3) and subsequently builds the actual dynamical data block list, as stored in data block list 65 in RAM 59, by including the length and sector list. These parameters need not to be known at programming time. Based on the structuring of data blocks and the identification, the memory controller 57 recognizes the data blocks and determines the length and sectors. This principle is chosen as it allows also to remotely load a program in the RBS 30 via one of the control units CUs 45(*o*). The memory controller 57 gets the data blocks one-by-one, stores them in the data block list 65 in RAM 59, and once all data blocks are stored, initializes the dynamical data block list 65. A programmer is not required to know how big sectors are or the way the memories 33, 49 are build.

The defining DTD is a child of the original block list definition, as stored in default structures 71, as given below.

```
BLOCKLISTDEFINITION.DTD
<!ELEMENT structuredefinition (structurename, structureblack)>
<!ELEMENT structurename (# BLOCKNAME)>
<!ELEMENT structureblock (blockname)+>
<!ELEMENT blockname (# TEXT)>
BLOCKLIST.XML
<structuredefinition>
```

-continued
```
<structurename> blocklist </structurename>
<structureblock>
    <blockname>blocklist </blockname>      "The block list itself"
    <blockname>resourcetable </blockname>  "The resource table"
    <blockname>sminitial </blockname> "The initial state
    machine for basic XDR functions"
        !  !  !
    <blockname>txxxxx </blockname>   "all other
    SM/TASKS/STRUCTURES"
</structureblock>
</structuredefinition>
```

It is up to the implementation of the programming environment whether defined block names are automatically added to the block list or that one needs to define first the block name in the block list before creating the block.

II.3 XML, Example: Resource Table Definition.

The resource table definition has 2 parts; one related to the programming environment defining resource types, and the other one related to the radio base station 30 with the actual resources definitions. The difference is required to make the program XDR version independent.

The defining resource type DTD, being a child of the original structure definition that is stored in default structures 73 (FIG. 3), is given below.

```
RESOURCETYPEDEFINITION.DTD
<!ELEMENT structuredefinition (structurename, structureblock)>
<!ELEMENT structurename (# BLOCKNAME)>
<!ELEMENT structureblock (resourcetype)+>
<!ELEMENT resourcetype (resourcetypename), (parametername,
parametervalue)*, (startcommand)?, (statuscommand)?,
(terminationcommand)?, (triggerlist)?>
<!ELEMENT resourcetypename (#TEXT)>
<!ELEMENT parametername (#TEXT)>
<!ELEMENT parametervalue (#TEXT)>
<!ELEMENT startcommand(#TEXT)>
<!ELEMENT statuscommand (#TEXT)>
<!ELEMENT terminationcommand (#TEXT)>
<!ELEMENT triggerlist (triggerspecification)+>   "all triggers
available for that resource type"
<!ELEMENT triggerspecification (#TEXT)>
RESOURCETYPELIST.XML
<structuredefinition>
    <structurename> blocklist </structurename>
    <structureblock>
        <resourcetype>
```

-continued
```
            <resourcetypename>DAC</resourcetypename>
            <parametername>conversionspeed</ parametername>
            <parametervalue>MHZ</ parametervalue>
            <triggerlist> . . . . .
        </resourcetype>
        <resourcetype>
            <resourcetypename>DSP</resourcetypename>
            <parametername>instructionspeed</parametername>
            <parametervalue>MHZ</parametervalue>
            <parametername>localmemory</parametername>
            <parametervalue>Kbyte</parametervalue>
            <startcommand>xxxxxxxxxx</startcommand>
            <statuscommand>xxxxxxxxxx</statuscommand>
            <terminationcommand>xxxxxxxxxx</terminationcommand>
            <triggerlist> . . . . .
        </resourcetype>
        !!!!!!!!!!!!!
    </structureblock>
</structuredefinition>
```

In an embodiment, it is required that parameters and commands are identical for resources of the same type, i.e., to allow the generic program loaded in the RBS 30 to run on different versions of the XDR. Resources might not require parameters or do not have commands. The generated .XML is used in the programming environment. When using required resources in the task definition, no other types may be used then defined here.

The actual resource allocation table 63 is also a child of the structure DTD, as stored in the default structures 73. In contrast to the resource type, the actual resource table 63 defines the actual resources available for the XDR version of the XDR. Therefore, the actual resource allocation table 63 is the only XDR version dependent component of the program. The created XML document is used by the monitor 31 to 35 create runtime (at initialization) the resource allocation table 63.

```
RESOURCEDEFINITION.DTD
<!ELEMENT structuredefinition (structurename, structureblock)>
<!ELEMENT structurename (#BLOCKNAME)>
<!ELEMENT structureblock (resourcedefinition)+>
<!ELEMENT resourcedefinition (resourcetypename, resourceid), (parametername,
resourceparametervalue)*>
<!ELEMENT resourcetypename (#RESOURCETYPENAME)>
<!ELEMENT resourceid (#INTEGER)> "ID is the bus ID, unique for each resource"
<!ELEMENT parametername (#PARAMETERNAME)>
<!ELEMENT resourceparametervalue (#LONGINTEGER)>
RESOURCELIST.XML
<structuredefinition>
        <structurename>            resourcelist    </structurename>
        <structureblock>
            <resourcedefinition>
                <resourcetypename>       DAC               </resourcetypename>
                <resourceid>             2F                </resourceid>
                <parametername>          conversionspeed   </parametername>
                <resourceparametervalue> 1200              </resourceparametervalue>
```

-continued

```
        </resourcedefinition>
        <resourcedefinition>
            <resourcetypename>       DAC              </resourcetypename>
            <resourceid>             2E               </resourceid>
            <parametername>          conversionspeed  </parametername>
            <resourceparametervalue> 100              </resourceparametervalue>
        </resourcedefinition>
   !!!!!!
        <resourcedefinition>
            <resourcetypename>       DSP              </resourcetypename>
            <resourceid>             12               </resourceid>
            <parametername>          instructionspeed </parametername>
            <resourceparametervalue> 600              </parametervalue>
            <parametername>          localmemory      </parametername>
            <parametervalue>         2024             </parametervalue>
        </resourcedefinition>
        !!!!!!
    </structureblock>
</structuredefinition>
```

II.4 XML, State Machine Definition.

A state machine SM(q) is the base element in organizing the functions to be performed by the XDR. A state machine is defined as a table of state transition definitions. Each state transition definition comprises a current state name C, a trigger mask TM and a next state name N. Each state machine SM(q) has just one and no more than one state transition definition that specifies the start state characterized by having no current state and no trigger mask TM value. The next state in this state transition definition is the start state of the state machine SM(q). A state is the name of a task or state machine SM(q) currently executed, or the next one to be executed. Each state machine SM(q) may be finite or infinite meaning it does not or it does have one or more exit states. The exit state is characterized by a state transition definition having a current state and a trigger mask but no next state defined.

Figure 7:
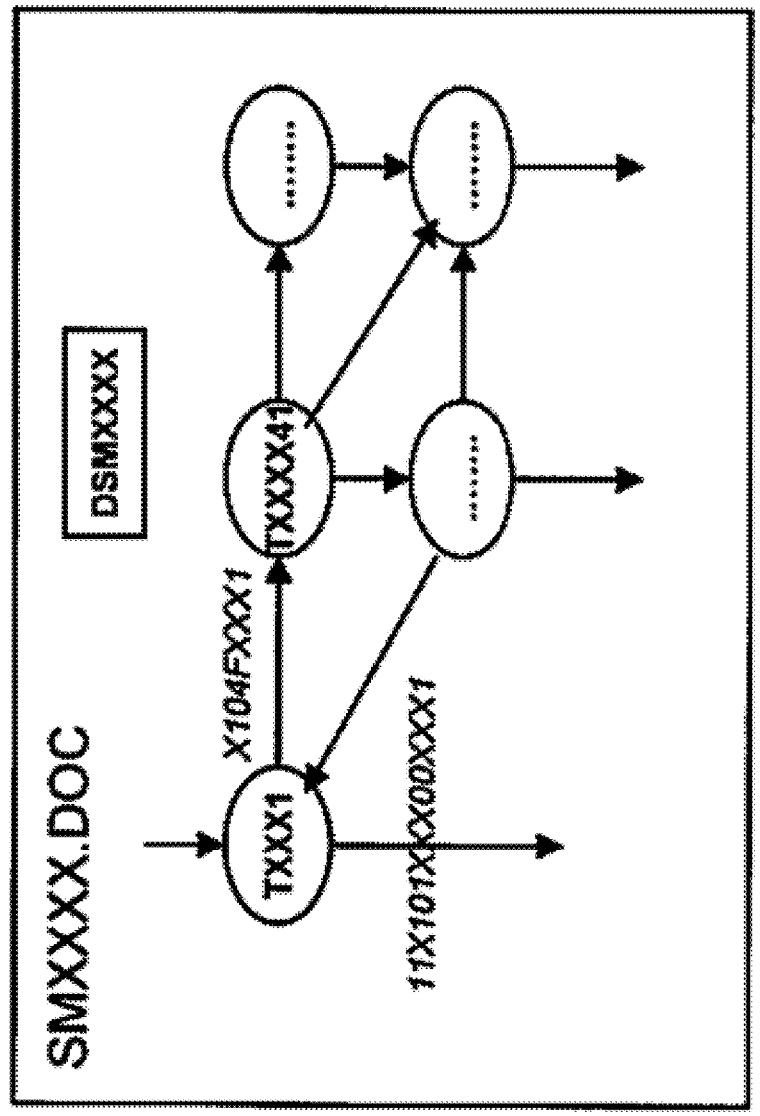
FIG. 7 shows a diagram to illustrate using XML in a state machine definition.

FIG. 7 shows the resulting design document made with an XML defined instance of a state machine (.XML as shown below) based on the template (.DTD as shown below).

```
STATEMACHINEDEFINITION.DTD
  <!ELEMENT statemachinedefinition (statemachinename),
(memorydeclaration)*, (initstate), (statetransition)+, (exitstate)*>
  <!ELEMENT memorydeclaration (memoryblockname,blockzise)>
  <!ELEMENT initstate (nextstatename)>
  <!ELEMENT statetransition (currentstatename, triggermask,
nextstatename)>
  <!ELEMENT exitstate (currentstatename, triggermask)>
  <!ELEMENT memoryblockname (#TEXT)>
  <!ELEMENT blockzise (#INTEGER)>      "Size in Kbyte,
monitor expands to n sectors based on sector size"
  <!ELEMENT statemachinename (#BLOCKNAME)>
  <!ELEMENT currentstatename (#BLOCKNAME)>
  <!ELEMENT nextstatename (#BLOCKNAME)>
  <!ELEMENT triggermask (#BITPATTERN)>
SMXXXX.XML
  <statemachinedefinition >
    <statemachinename> SMXXXX    </statemachinename>
    <memorydeclaration>
      <memoryblockname> DSMXXXX       </memoryblockname>
      <blockzise> 64 </blockzise>
    </memorydeclaration>
    !!!!!!!
    <initstate>
      <nextstatename> TXXXX1    </nextstatename>
    </initstate>
    <statetransition>
      <currentstatename> TXXXX1   </currentstatename>
      <transitionmask> 0X104FXXX1 </transitionmask>    "X= bit
```

-continued

```
don,t care, 0 or 1 binary bit 2-F hexadecimal(4bits)"
      <nextstatename> TXXXX41 </nextstatename>
    </statetransition>
    !!!!!!!!!
    <exitstate>
      <currentstatename> TXXXX1 </currentstatename>
      <triggermask> 011X101XXX00XXX1 </triggermask>
    </exitstate>
        !!!!!!!!!!!!
  </statemachinedefinition>
```

In a preferred embodiment, some basic system tasks are available for the XDR like remote program loading, remote/local maintenance and remote/local system restart. Remote control may be forced by sending a special character string to one of the CU's 45(o) which will, then, generate a specific trigger pattern that will be sent to the monitor 31. These basic system tasks shall be considered in the highest level (first started) state machine SM(1).

II.5 XML, Task Definition.

Figure 8:
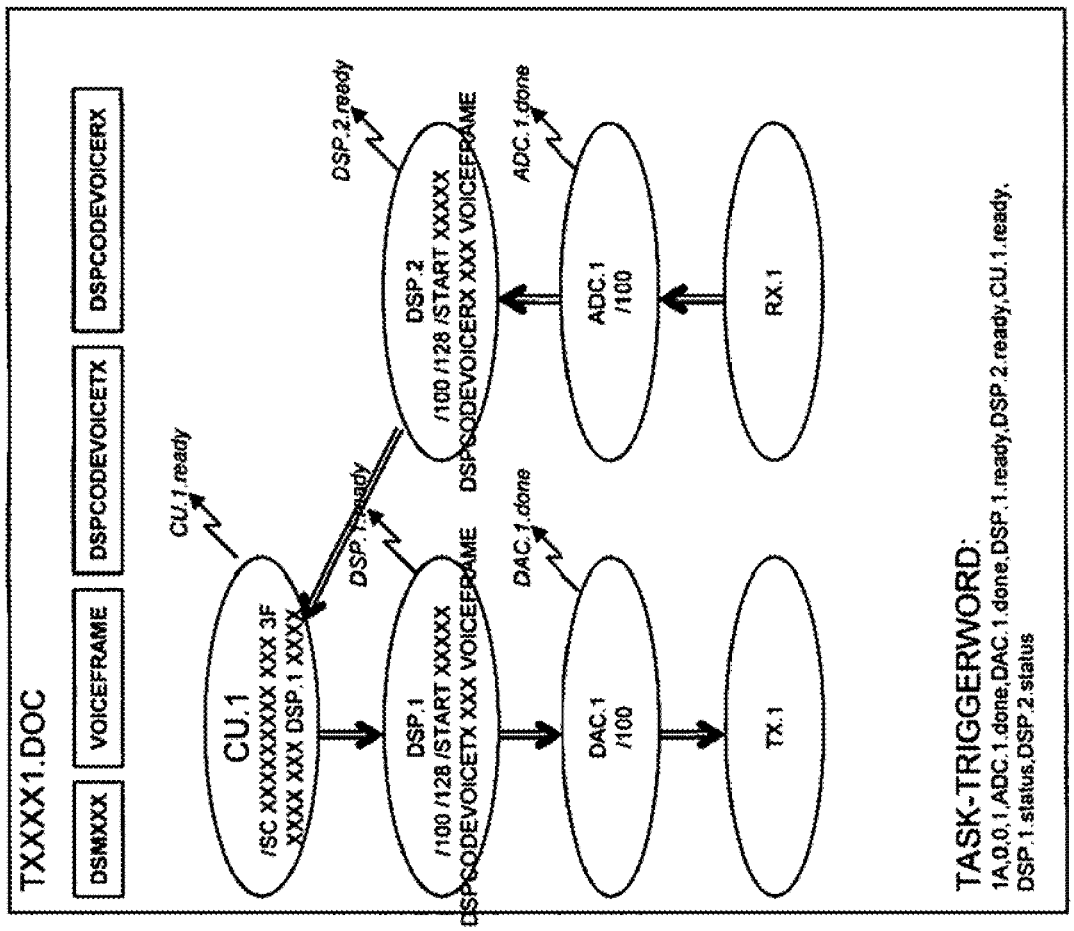
FIG. 8 shows a diagram to illustrate using XML in a task definition.

FIG. 8 shows a diagram to illustrate using XML in a task definition.

As the state machine SM(q) is the base element in organizing the functions so is the task the basic element of a function. In order to explain the task implementation, a small simplified function is described. The reference task is activated by a state machine SM(q) belonging to a mobile phone (not shown) in reach of the radio base station 30. Each mobile phone in this example has it's own state machine SM(q) running. The task is activated when the mobile phone answers an incoming call from a calling telephone. A voice data stream is received by the mobile phone from a CU 45(o), packaged by a DSP 47(p), converted to an analogue signal by a DAC 41(m) and transmitted by a TX (35(i). At the same time, the opposite path is RX 37(j), ADC 43(n), DSP 47(p), CU 45(o). The CU 45(o) is a single resource handling both directions as the DSPs 47(p) are double, one for each direction. The CU 45(o) may be set for checking "on-hook" of the calling telephone, whereas the second mentioned DSP 47(p) does this check for the mobile telephone.

```
TASKDEFINITION.DTD
<!ELEMENT taskdefinition (taskname, resourcedefinition, channeldefinition, datadefinition,
triggerdefinition)>
<!ELEMENT taskname (#BLOCKNAME)>
<!ELEMENT resourcedefinition (resourcetype)+>    "Correct definition is checked by programming
environment against RESOURCETYPELIST.XML"
<!ELEMENT channeldefinition (channeldeclaration)+> "not used for target XDR but for generating
graphical document of task"
<!ELEMENT datadefinition (datablock)+>
<!ELEMENT triggerdefinition (triggerelement)+>
<!ELEMENT resourcetype (resourcetypename.sequencenumber), (parametername,parametervalue)*,
(startcommand)?, (statuscommand)?, (terminationcommand)?>
<!ELEMENT resourcetypename (#RESOURCETYPENAME)>
<!ELEMENT sequencenumber (#INTEGER)>       "if more then one resource of the same type is
required"
<!ELEMENT parametername (#PARAMETERNAME)>
<!ELEMENT parametervalue (#INTEGER)>       "Entered value must be lower then the highest
value for that parameter in the RESOURCELIST.XML"
<!ELEMENT startcommand(#STARTCOMMAND)>
<!ELEMENT statuscommand (#STATUSCOMMAND)>       "the commands are retrieved from
RESOURCETYPELIST.XML and may be modified, during programming"
<!ELEMENT terminationcommand (#TERMINATIONCOMMAND)>
<!ELEMENT channeldeclaration (source,destination)>
<!ELEMENT source (#RESOURCETYPENAME.#SEQUENCNUMBER)>
<!ELEMENT destination (#RESOURCETYPENAME.#SEQUENCNUMBER)>
<!ELEMENT datablock (#DATABLOCKNAME)>
<!ELEMENT triggerelement
(|'0'|'1'|HEX|#RESOURCETYPENAME.#SEQUENCENUMBER.#TRIGGERSPECIFICATION|
#RESOURCETYPENAME.#SEQUENCENUMBER.#STATUS)
TXXXX1.XML
<taskdefinition>
   <taskname> TXXXX1 </taskname>
   <resourcedefinition>
      <resourcetype>
         <resourcetypename>         CU       </resourcetypename>
         <sequencenumber>           1        <sequencenumber>
         <startcommand>                       "only startcommand requires
modifications rest of commands is as standard defined."
                                    XXXXXXXXX       "XXXX is non modified part of
the command"
                                    XXX 3F XXXX     "CU operation is bidirectional
with check on 'on-hook'."
                                    XXX DSP.1 XXXX  "destination of CU output"
         </startcommand>
      </resourcetype>
      <resourcetype>
         <resourcetypename>         DSP      </resourcetypename>
         <sequencenumber>           1        </sequencenumber>
         <parametername>            instructionspeed </parametername>
         <resourceparametervalue>   100      </parametervalue>
         <parametername>            localmemory      </parametername>
         <parametervalue>           128      </parametervalue>
         <startcommand> XXXXX DSPCODEVOICETX XXX VOICEFRAME <start-
command>
      </resourcetype>
         !  !  !  !  !  !
   </resourcedefinition>
   <channeldefinition>
      <channeldeclaration> CU.1,DSP.1   </channeldeclaration>
      <channeldeclaration> DSP.2,CU.1   </channeldeclaration>
      <channeldeclaration> DSP.1,DAC.1  </channeldeclaration>
      <channeldeclaration> ADC.1,DSP.2  </channeldeclaration>
      <channeldeclaration> RX.1,ADC.1   </channeldeclaration>
      <channeldeclaration> DAC.1,TX.1   </channeldeclaration>
   </channeldefinition>
   <datadefinition>
      <datablock> DSMXXXX          </datablock>
      <datablock> VOICEFRAME       </datablock>
      <datablock> DSPCODEVOICETX   </datablock>
      <datablock> DSPCODEVOICERX   </datablock>
   </datadefinition>
   <triggerdefinition>
      <triggerelement> 1A          </triggerelement>
      <triggerelement> 0           </triggerelement>
      <triggerelement> 0           </triggerelement>
      <triggerelement> 1           </triggerelement>
      <triggerelement> ADC.1.done  </triggerelement>
      <triggerelement> DAC.1.done  </triggerelement>
      <triggerelement> DSP.1.ready </triggerelement>
```

-continued

```
<triggerelement> DSP.2.ready    </triggerelement>
<triggerelement> CU.1.ready     <triggerelement>
<triggerelement> DSP.1.status   </triggerelement>
<triggerelement> DSP.2.status   <triggerelement>
</triggerdefinition>
</taskdefinition>
```

III. Analogue Signal Manifold.

In a third aspect, the invention is directed to the application of a manifold $39(k)$ in a radio base station 30.

Figure 9:
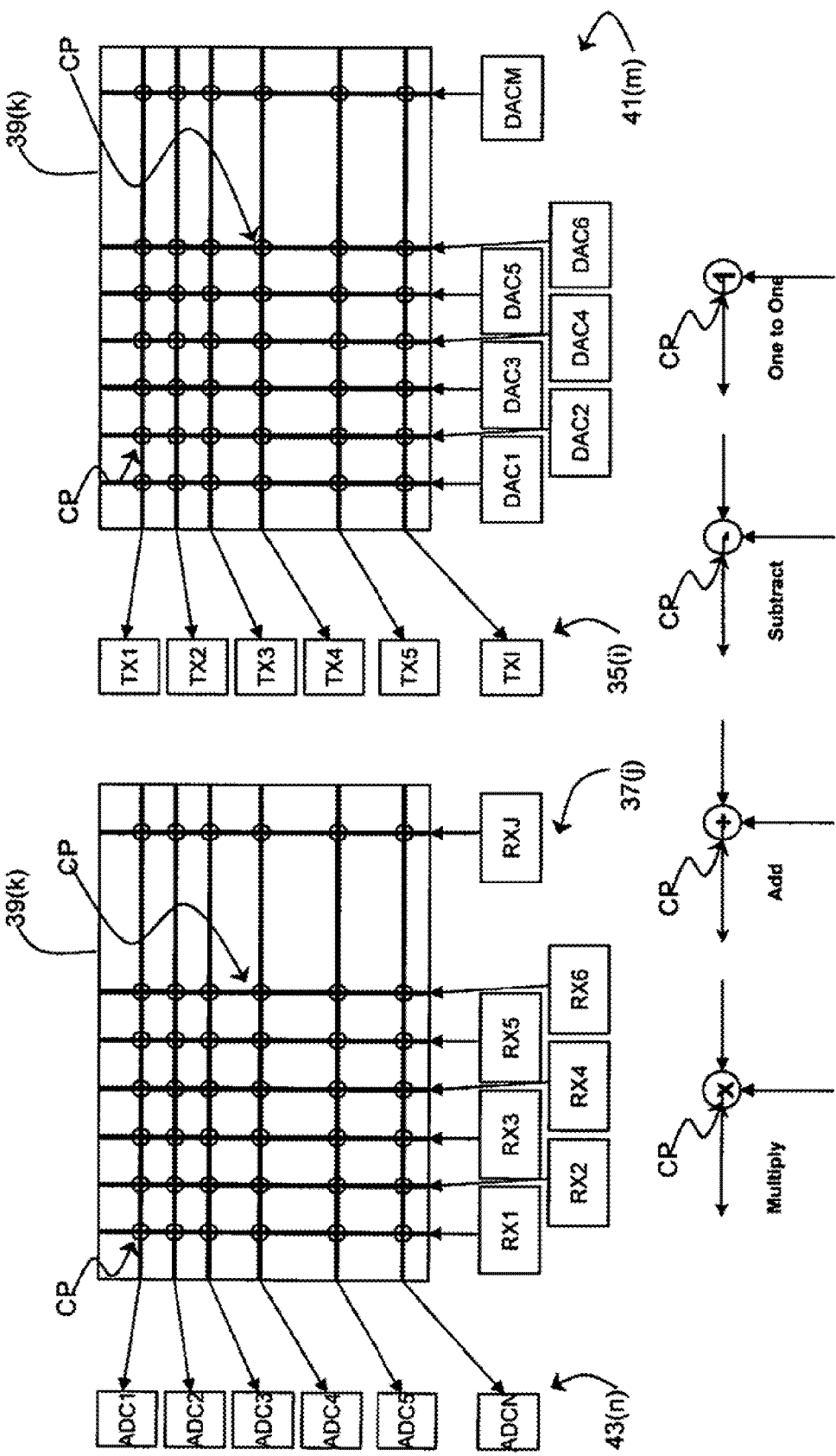
FIG. 9 shows a block diagram of an example of a "manifold", i.e., defined as a connection station comprising nodes between input and output lines and arranged to perform mathematic operations on incoming signals on the input lines.

At the right hand side, FIG. 9 shows an example how a manifold $39(k)$ may make connections between TXs $35(i)$ and DACs $41(m)$ at cross points CP. One DAC $41(m)$ may be connected to multiple TXs $35(i)$, or multiple DACs $41(m)$ may be connected to just one TX $35(i)$, or just one DAC $41(m)$ to one TX $35(i)$. Thus, many parallel connections are possible at the same time.

The left hand part of FIG. 9 shows how RXs $37(j)$ may be connected to ADCs $43(n)$ at cross points CP of a manifold $39(k)$. The RX/ADC manifold is comparable to the TX/DAC manifold shown at the right hand side. One or more RXs $37(j)$ may be connected to one or more ADCs $43(n)$. Thus, for the RX/ADC manifold, many connections are possible in parallel too.

For functions where more then one ADC $43(n)$ or DAC $41(m)$ is used, it is required that they are synchronized. In the implementation, it is therefore preferred to have all ADCs $43(n)$ and DACs $41(m)$ running synchronously on one common clock signal.

As indicated earlier, at the cross points CP of rows and columns where connections may be made, simple arithmetic functions may be performed, like multiplying, adding, subtracting, and one-to-one. However, logic operations may be also be envisaged. An example of an implementation of such cross point functions is shown in the lower part of FIG. 9. The cross point functions, one-to-one, add, subtract, multiply, are only effective for the rows. In the column the signals remain the same. The signal boundaries +1 and −1 are maintained also with add and subtract functions. The row input allows a connection of, for instance, a biasing source (not shown) with e.g. an offset frequency.

Figure 10:
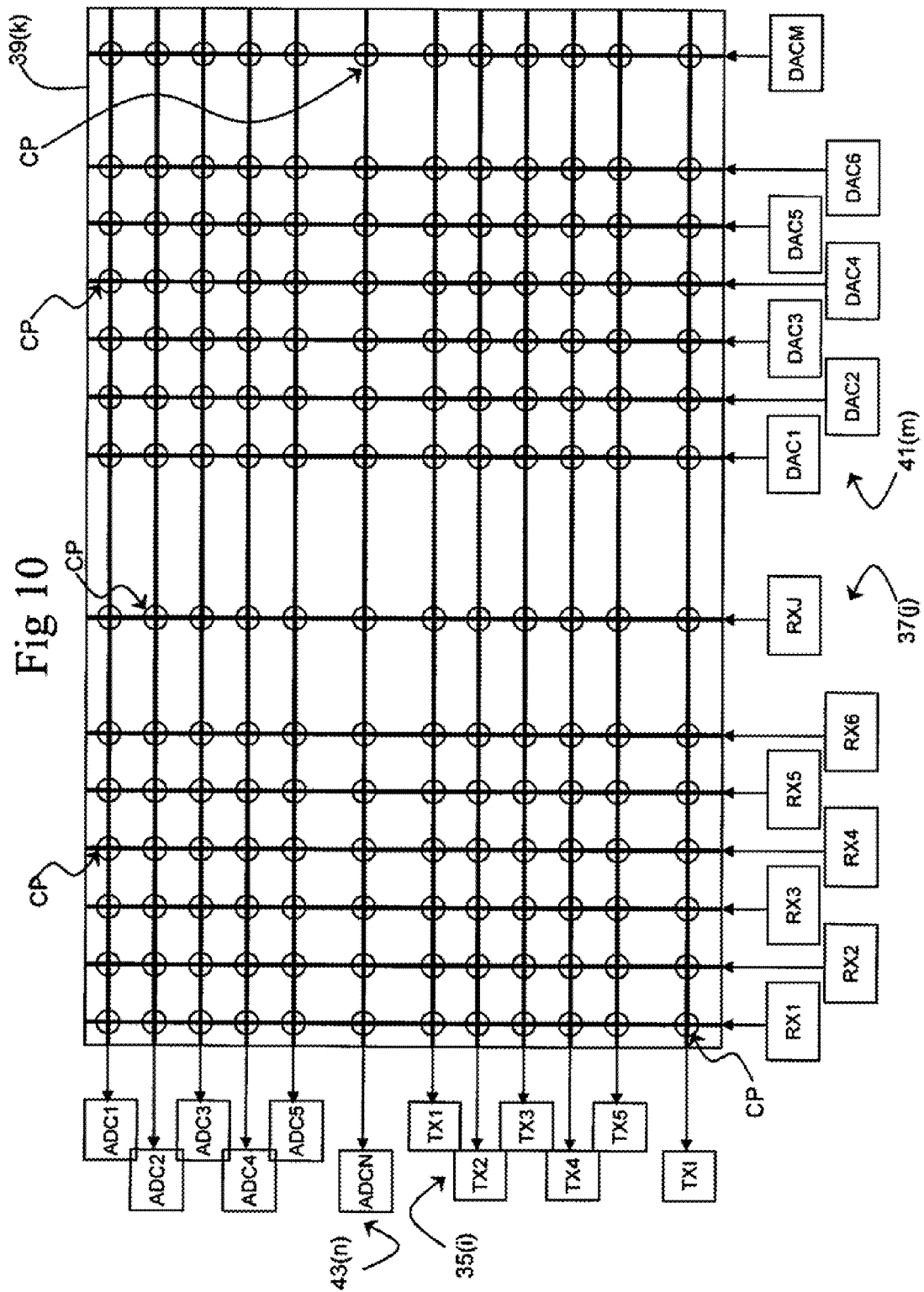
FIG. 10 shows a block diagram of an example of an analogue manifold.

In order to achieve an even greater flexibility in possible routings, the two manifolds shown at the left hand and right hand side of FIG. 9 may easily be integrated to one manifold $39(k)$ as shown in FIG. 10. This allows additional features as direct retransmit and using DACs $41(m)$ and ADCs $43(n)$ for signal manipulations. The functions in the cross points CP are comparable to that of the separate manifolds of FIG. 9. The manifold of FIG. 10 may have one additional function to provide a central synchronization clock signal to attached elements.

IV. Multi Sectional Bus.

In a fourth aspect, the invention relates to a multi sectional bus.

IV.1 Design Considerations for a Multi Sectional Bus with Cross Over.

State of the art bus concepts may not be fast enough for the software radio base station application as illustrated above. Main reasons are: normal busses or quite extensive (up to 10 or more inches on a double EURO board) giving a high capacitive load and have a large parallel load from all the devices connected. Realization of bus speeds above 600 MHz is very unlikely in these situations. An other problem is that not all data transports need to use the full bus. Some need only 16 bits wide whereas others use 128 bits in parallel to be able to work in "real-time". In the conventional bus, all data transports use the full available bus width even when full bus width is not required.

The bus as proposed here, overcomes these negative effects and in all provides a bus which is much faster and also the effective throughput in bits per second is extremely higher then that of a conventional bus.

The bus 51 as disclosed here, and as illustrated with reference to FIGS. 11 through 17, is build up by sections, each section being a bus ASIC(r), r=1, 2, ..., R, connected to a resource. Any one of the components shown in FIG. 2, connected to the bus 51, may be such a resource. Each ASIC(r) comprises a bus control unit $93(r)$ with suitable buffer, like a FIFO memory.

A section might also be integrated with a resource if used gate technology allows such. There is no multiple load as each bus ASIC(r) is connected with either one of its sides, indicated with A and B in FIG. 11, to just one other ASIC(r). Also the length of a connection is relative small (typically less then 2 inches). Although the delay over a number of ASICs might be a little larger than over a bus of the prior art, the inter word delays (i.e., delay between 2 consecutive data words) is very small and constant. As data packages on the bus 51 are always in one direction during a bus cycle, always from source to destination, the result is a little increase in delay of a data package but much faster transport of the data package itself. This latter feature increases the effective throughput.

Data packages are shown to comprise a destination header, an indication of a start address, a length indicator and a data block. However, other formats known to persons skilled in the art are possible.

With current technology, the transport rate between ASICs may be in the range from 1-4 Ghz.

The width of the bus 51 foreseen in the XDR. is 256 bits. Internal for the ASIC such a number of bits is no objection. However, the number of pins of an ASIC chip do not allow such a high number of parallel lines. Also the implementation of the board on which the ASICs are build becomes rather complex. Therefore, in a preferred embodiment, multiplexing is used up to 64 bits. This means that a 256 bits bus signal is sent in 4 cycles on a 64 bits bus. With a bus 51 of 1 GHz, the maximum transport rate is then 250 MHz. For current envisaged XDR applications this is sufficient (256 bits/250 MHz). It should be noted that other combinations may be used. E.g., a 512 bits bus signal may be transmitted in 8 cycles, being equivalent to a transport rate of 125 MHz rate. With 4 GHz busses or wider busses (i.e., more lines) faster transport rates may be obtained.

The bus 51 is foreseen to be extendable to other boards by means of a 100 Gb/s fiber link. Basic embodiment will be an ASIC as defined above with the change that it has no resource attached and it's B side provides a 2*100 Gb/s stream connection. Not only the actual bus signals but also the control signals are transmitted in this stream. This specific ASIC has the possibility to change the default settings so A and B side are exchangeable.

Figure 11:
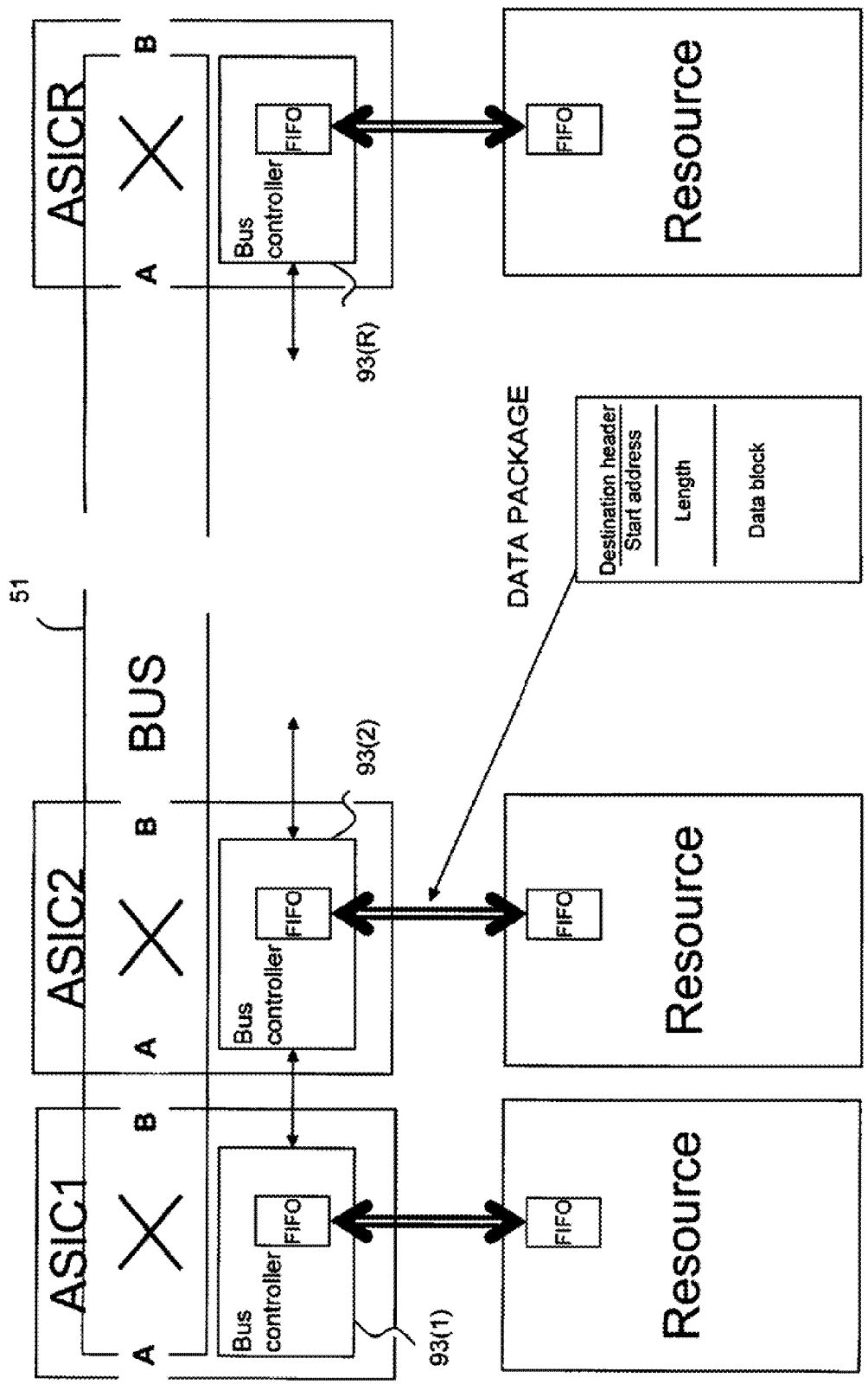
FIG. 11 shows a block diagram of an example of "on board" sections of a bus.

As shown in FIG. 11, both resources and bus ASICs have a FIFO system as the bus is basically asynchronous. Minimum size of the data path is envisaged to be 16 bits.

As memory addresses are preferably 64 bits, resources with 16 or 32 bits access will need to use 4 or 2 words for a start address.

IV.2 Inter ASIC Transport

Figure 12:
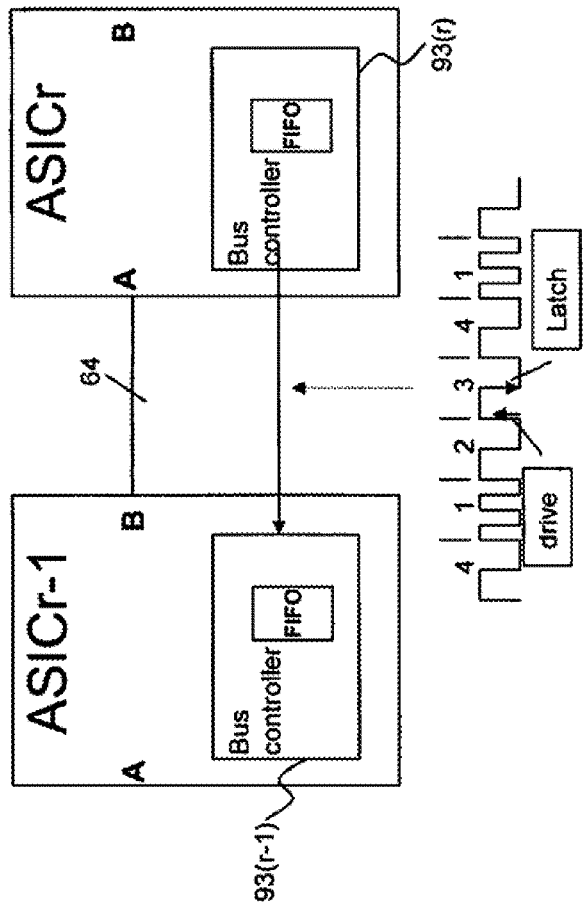
FIG. 12 shows a block diagram of two adjacent ASICs (Application Specific Integrated Circuit) for further explaining the invention.

FIG. 12 shows two adjacent ASICs (r and r−1) on a same board with a signal diagram to explain the multiplexing used. The multiplexing is controlled by a strobe signal always generated by the A side of an ASIC. For synchronizing, the first cycle has a double frequency. Depending on read or write (direction is AB or BA) data is made available on the rising flank and latched at the other end on the falling edge.

IV.3 Of-Board

Figure 13:
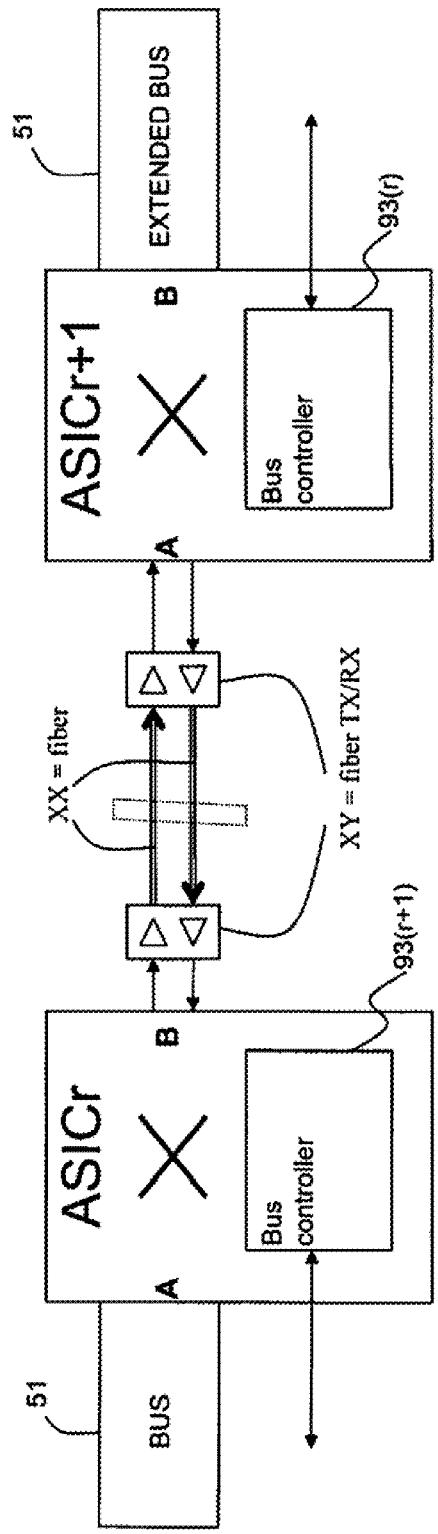
FIG. 13 shows a block diagram of two adjacent ASICs each one located as a terminating ASIC on a separate board.

FIG. 13 shows two ASICs (r and r+1) terminating different boards but that have to be connected by a fiber 95. These 2 terminating ASICs do not have a resource attached but do have all other features of the previously described ASICs. The ASICs are programmed for signal transport in the direction AB (default) or BA in which chip leads remain the same but the AB definition is exchanged. The ASICs provide a single bit stream including the bus signals, control signals and synchronization signals. The actual fiber transmitter and receiver are not part of the ASIC. The length of the fiber 95 is typically less then 4 inches based on boards placed next to each other. The bus 51 may be extended over more boards if so required.

IV.4 ASIC Internal Matrix for Bus Assignment and Isolation.

Figure 14:
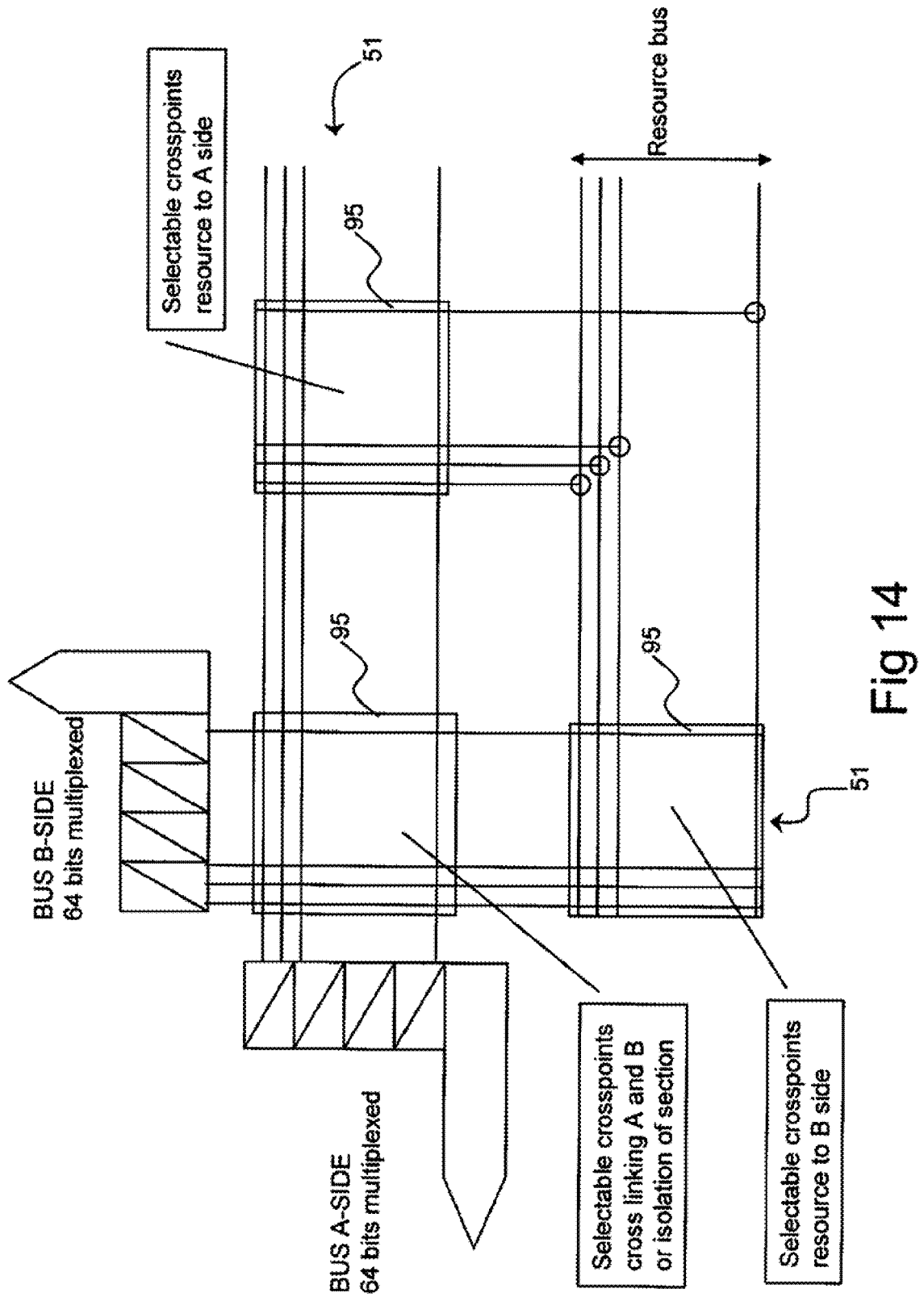
FIG. 14 shows a block diagram of an ASIC internal matrix for bus assignment and isolation.

FIG. 14 schematically shows an ASIC internal matrix for bus assignment and isolation. The bus 51 comprises a plurality of selectable cross points 95 that are controlled by a bus controller 93(r) (cf. FIGS. 12, 13). As controlled by the bus controller 93(r) each selectable cross point 95 allows to couple an input line with an output line. Input may either be at the A side or at the B side, or vice versa, where multiplexed signals will arrive are depart, e.g., in portions of 64 bits.

There is no function envisaged at points where lines are crossing. However, note that the setup as shown provides for the option to isolate a group of input/output lines but also to shift connections between input lines and output lines. For instance, it is not necessary to connect input lines 1-16 to output lines 1-16. As an example 16 bits on input lines 1-16 on the A side may be connected to 16 arbitrary output lines within the group of lines 65-92 on the B side.

Note that an assignment in sets of 16 lines in bus 51 is preferred but that the invention is not restricted to this number. The assignment may, e.g., be per 8 lines but that results in higher overhead. Using 16 lines is advantageous since most current resources use 16 bits or a multiple thereof.

IV.5 Internal Connections Bus ASIC.

Figure 15:
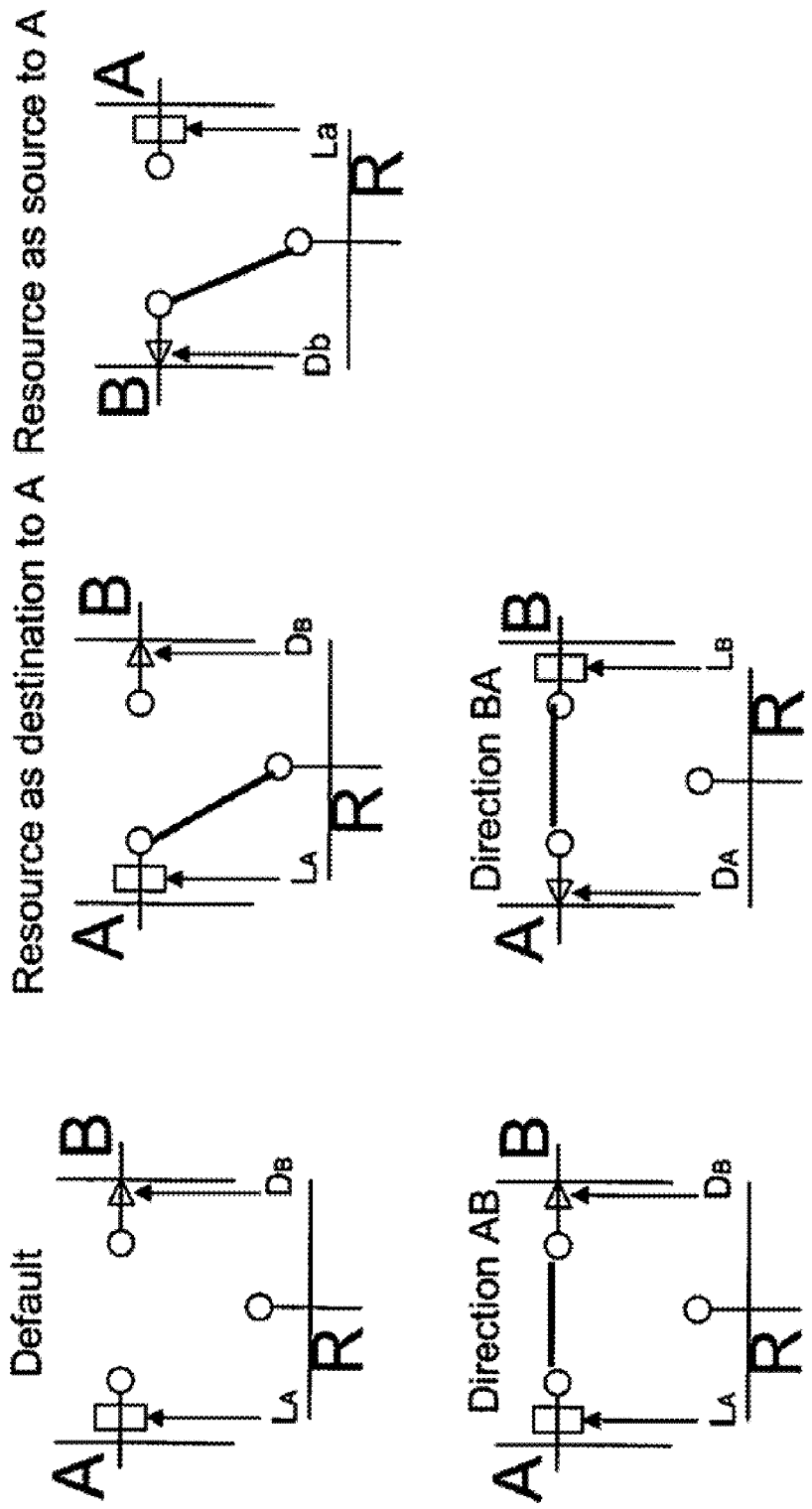
FIG. 15 shows some examples of possible configurations of an ASIC internal connections bus.

FIG. 15 shows some possible configurations of how internal connections in an ASIC(r) may be made between bus lines and lines of a resource. A denotes a line of the A side, B denotes a line of the B side, and R denotes a line connected to a resource. LA and LB denote a read instruction signal on A and B, respectively. DA and DB denote a write instruction signal on A and B, respectively.

Defaults are used for A, B or R if no connection is assigned. In such a default state, A is not used, indicated by, e.g., A=read and B is not used, indicated by, e.g., B=write. At maximum, one connection may exist: i.e., either a connection AB, a connection BA, a connection BR, a connection RB, a connection RA, or a connection AR (or none). If the cross point is not involved it is in default state unless crossover (cf. FIG. 16c) is used and the cross point is assigned in that way. Preferably, the connection configuration is always valid per group of bits, e.g., 16 bits.

The La, Lb, Da and Db lines have a value dependent on read or write operation per group of bits, so, e.g., 16 bits. So, e.g., a 1 signal may indicate a read instruction, and a 0 signal may indicate a write instruction. In an embodiment, the signals are enabled by the 64 bit multiplexing.

The following table gives an example of internal configurations for the bus ASIC.

| | BUS ASIC Internal configurations | | | | |
|---|---|---|---|---|---|
| | Read/Write | | Connection | | |
| Config. name | A | B | AB | AR | BR |
| Default | Read | Write | Open | Open | Open |
| A to B | Read | Write | Closed | Open | Open |
| B to A | Write | Read | Closed | Open | Open |
| R destination to A | Read | Write | Open | Closed | Open |
| R source to A | Write | Write | Open | Closed | Open |
| R destination to B | Read | Write | Open | Open | Closed |
| R source to B | Read | Read | Open | Open | Closed |

IV.6 Example of Multiple Operations in a 12 Section Bus.

Figure 16A:
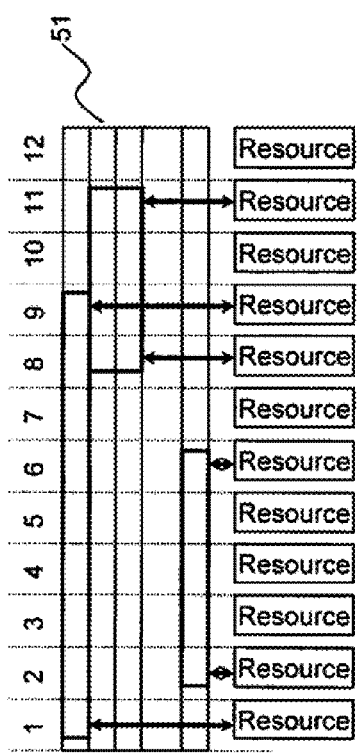
FIGS. 16a, 16b, and 16c show examples of multiple operations in a 12 section bus.
Figure 16B:
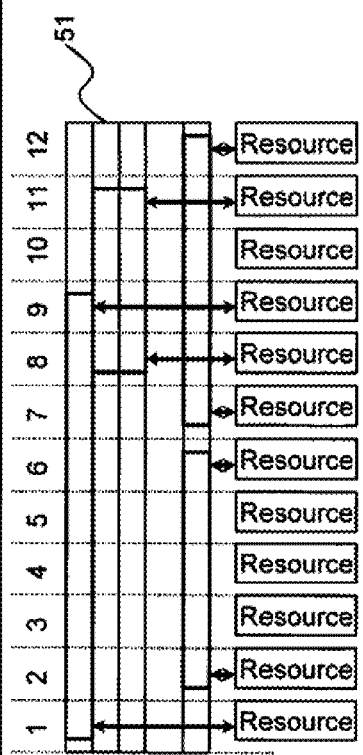
Figure 16C:
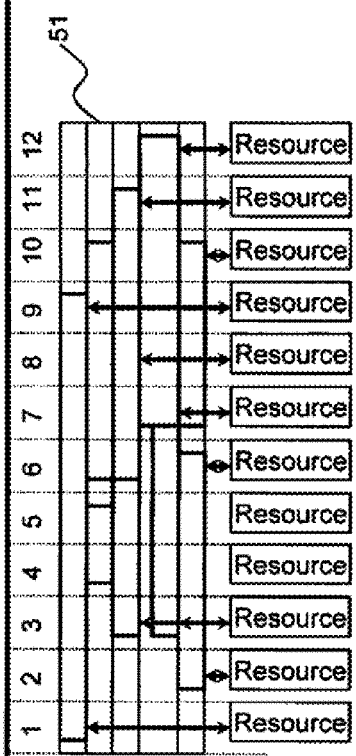

FIGS. 16a, 16b, 16c show examples of possible operations of the bus ASIC with 12 sections.

FIG. 16a shows a parallel operation. Here, by suitable connections made by cross points 95, the main bus 51 is split in separate "sub busses" indicated with dark grey color. Resource 1 and 9 are connected with a 16 bit bus. 2 and 6 also by a 16 bit bus. 8 and 1 are connected by a 32 bit bus.

FIG. 16b shows an example of isolated portions of a set of lines of bus 51. Two sub busses are shown that do not extend beyond the bus ASIC of the source and destination resource. A sub bus is defined as a connection between two resources via a part of bus 51. The isolation allows multiple usage of a set of lines of bus 51. For instance, as shown, resources 2 and 6 are internally connected by means of a sub bus comprising a portion of one set of lines of bus 51. At the same time, however, resources 7 and 12 are also connected to each other by using another sub bus comprising another portion of the same set of lines of bus 51: This is possible since the lines can be interrupted between any consecutive two ASICs, as explained with reference to FIG. 15. Thus, the sub bus connecting resources 7 and 12 is isolated from the sub bus used to connect resources 2 and 6. The connections via these sub busses are in parallel to the connections between resources 1 and 9, and between 8 and 11.

FIG. 16c shows an example of cross-over, i.e., a connection between resources via the bus 51 is implemented such that each sub bus occupies portions of different sets of lines of bus 51. This is possible since each ASIC(r) is configured to connect (groups of) input lines with different (groups of) output lines. Thus, with a number of parallel isolated sections, connections may be made, however, not as a consecutive sections. In this case, cross over in an ASIC allows to further increase parallel usage. This may be done separate for every 16 bit group. In the example of FIG. 16c, there is a 32 bits "sub-bus" between resource 3 and 10, however, implemented via two separate 16 bits portions, i.e., an upper part and a lower part. Cross-over in the upper part is done in section 6, in the lower part in section 7.

IV.7 Bus Negotiation Principle.

In FIG. 17, part of a chain of bus controllers 93(r) in the bus ASIC's is shown. An example may illustrate the principle of bus negotiation. The resource at ASIC(8) as source requests a bus characterized by a number of times a group of 16 bit (N) it needs for a communication and a destination D. For this example N=2 and D=10. The value of P is 0 as it is a request (P=Portion, P is used to indicate which portions of the bus are used for an activation). The bus controller 93(8) sends the request to bus controller 93(9). As shown, ID 8 is smaller then the destination ID 10. If the destination ID would be smaller than 8, the bus controller 93(8) would sent the request down to bus controller 93(7).

Bus controller 93(9) forwards the request to bus controller 93(10) since the destination ID 10 is still higher than destination ID 9. Bus controller 93(10) receives the request and the destination ID is now equal to the ID of the bus controller. Bus controller 93(10) does not transmit the request further to bus controller 93(11) but checks if a section of bus 51 can be made available. Bus controller 93(10) sets the bits in P to 1 corresponding with the 16 bits sections reserved.

A NSDP signal is generated, indicating the values of N, S, D, and P, and sent back by bus controller 93(10) to bus controller 93(9). As P no longer is 0, bus controller 93(9) recognizes the NSDP signal as a setting instead of a request. Bus controller 93(9) now checks if it is able to make the requested number N of sections available. It has the possibility of cross over to assign sections. Thus, the value of P of bus controller 93(9) might be different from that sent by bus controller 93(10). As the source ID 8 (it is a setting with P not 0) is lower then 9, bus controller 93(9) passes the NSDP signal through to bus controller 93(8) with the new set P value in the NSDP signal. Bus controller 93(8) receives the setting (P not 0) and will make sections available as did bus controller 93(9). As bus controller 93(8) will find that the ID 8 is equal to the source ID in the received NSDP signal, the bus controller 93(8) will not pass the NSDP signal further to bus controller 93(7) but will sent a ready signal to the resource with ID 8 informing it that the requested sub-bus is ready for use.

When the source 8 is ready with the data transport in the communication it desired to make, it gives the bus free again by sending a NSDP signal to bus controller 93(8) with N and P both set to 0. Routing is again based on the values of S and D and own ID. After receipt by bus controller 93(9), bus controller 93(9) will drop the reserved section and modifies the P value in view of the connection to section 10. Then, it forwards the NSDP signal to bus controller 93(10). Bus controller 93(10) will also unbook its section and recognize that destination D is equal to its own ID. P is set to 0 and the NSDP signal is returned to bus controller 93(9) as free message. Bus controller 93(9) just forwards the NSDP signal as it is not the source and P=0. Bus controller 93(8) will no longer forward the NSDP signal as source S equals its own ID and generate the "free" message to the resource.

What is claimed:

1. A radio base station comprising:
   a monitor, including a sequencer, an executor and a generator;
   a memory;
   one or more resources, said memory being connected to the monitor and arranged for storing tasks and data, each of said resources being connected to the monitor and arranged for at least one of performing an arithmetic function and executing a program, and
   at least one analog signal manifold comprising:
   input lines, output lines, and nodes for making connections between input and output lines, said input lines and output lines being connectable to predetermined resources and said nodes being arranged to perform a mathematical operation on an incoming signal on the input lines.

2. The radio base station according to claim 1, wherein said resources that are arranged to execute a program are also arranged to generate trigger signals and send them to the monitor, said monitor being arranged to receive said trigger signals, to read one or more tasks related to said trigger signals from said memory, to check whether resources required for performing said task are available and to send commands to selected resources specifying the task to be performed.

3. The radio base station according to claim 1, wherein connections between said memory and said monitor, and connections between said resources and said monitor are implemented by means of a bus.

4. The radio base station according to claim 3, wherein said resources are arranged for mutual communication via said bus.

5. The radio base station according to claim 3, wherein using the bus is based on a datagram principle.

6. The radio base station according to claim 1, wherein said memory comprises a task memory and a data memory.

7. The radio base station according to claim 1, wherein said monitor comprises a state machine sequencer for handling several state machines in parallel.

8. The radio base station according to claim 7, wherein said memory comprises a ROM portion and a RAM portion, said ROM portion storing state machine definitions for said state machine sequencer, task definitions and default structures, said RAM portion storing dynamic data.

9. The radio base station according to claim 8, wherein said RAM portion stores a resource allocation table, a data block list, and data blocks.

10. The radio base station according to claim 1,
    wherein said monitor comprises an executor arranged for:
    sending commands to resources;
    sending task block requests to memory;
    receiving status information from resources;
    receiving task blocks from memory; and
    maintaining said resource allocation table.

11. The radio base station according to claim 1,
    wherein said one or more resources comprises at least one of:
    a transmitter,
    a receiver,
    a digital analog converter,
    an analog digital converter,
    a control unit, and
    a digital signal processor.

12. The radio base station according to claim 11, wherein said one or more resources comprise at least one digital signal processor storing an executable image for performing a program.

13. The radio base station according to claim 11,
    wherein said one or more resources comprise
    a plurality of transmitters,
    a plurality of receivers,
    a plurality of digital analog converters, and
    a plurality of analog digital converters, said at least one analog signal manifold being arranged for making connections between said plurality of transmitters and said plurality of digital analog converters, and for making connections between said plurality of receivers and said plurality of analog digital converters.

14. The radio base station according to claim 1, wherein said mathematic operations comprise at least one of multiplying, adding, subtracting, and one-to-one connecting.

15. A method of operating a radio base station having a monitor, memory, one or more resources and at least one analog signal manifold, said memory being connected to the monitor and storing tasks and data, each of said one or more resources being connected to the monitor, said at least one analog signal manifold comprising input lines, output lines, and nodes for making connections between input and output lines, said input lines and output lines being connected to predetermined resources, said method comprising:
- performing one of an arithmetic function and executing a program by said one or more resources,
- reading one or more tasks from said memory, checking whether resources required for performing said one or more tasks are available and sending commands to selected resources specifying the task to be performed;
- connecting one or more input lines with one or more output lines of the analog signal manifold by means of said nodes; and
- performing at least a mathematical operation on an incoming signal on the input lines in said nodes.

16. The method of claim 15, wherein connections between said memory and said monitor and connections between said resources and said monitor are implemented by means of a bus and said resources are arranged for mutual communication via said bus.

17. The method of claim 15, wherein said monitor comprises a state machine sequencer for handling several state machines in parallel.

18. The radio the method of claim 15, further comprising
- storing a resource allocation table, a data block list and data blocks in a RAM portion of said memory, which comprises a ROM portion and the RAM portion, said ROM portion storing state machine definitions for said state machine sequencer, task definitions and default structures, said RAM portion storing dynamic data.

19. The method of claim 15, further comprising: sending commands to resources; sending task block requests to memory; receiving status information from resources; and
- receiving task blocks from memory.

20. The method of claim 15, the analog signal manifold being arranged for
- making connections between said plurality of transmitters and said plurality of digital analog converters, and
- making connections between said plurality of receivers and said plurality of analog digital converters.

21. The method of claim 15, wherein the step of performing a mathematical operation includes at least one of multiplying, adding, subtracting, and one-to-one connecting.

22. The radio base station according to claim 1,
- wherein said monitor comprises a generator arranged for:
- generating signals with intermediate frequencies.

* * * * *

UNITED STATES PATENT AND TRADEMARK OFFICE
CERTIFICATE OF CORRECTION

PATENT NO.       : 7,706,840 B2                                                Page 1 of 1
APPLICATION NO.  : 10/596779
DATED            : April 27, 2010
INVENTOR(S)      : Hageman It is certified that error appears in the above-identified patent and that said Letters Patent is hereby corrected as shown below:

In Fig. 2, Sheet 2 of 16, delete " 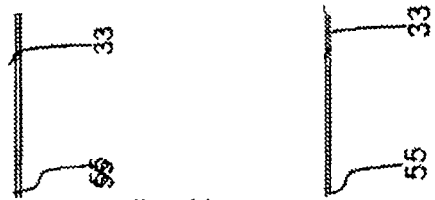 " and insert -- -- , therefor.

In Fig. 17, Sheet 16 of 16, delete "  " and insert -- --, therefor.

In Column 11, Line 63, delete "XML Structure" and insert -- XML, Structure --, therefor.

In Column 12, Line 62, delete "structureblack)>" and insert -- structureblock)> --, therefor.

In Column 14, Line 9, delete "</resourcetype" and insert -- </resourcetype> --, therefor.

In Column 14, Line 23, delete "</resourcetype" and insert -- </resourcetype> --, therefor.

In Column 14, Line 46, after "31 to", delete "35".

In Column 16, Line 24, delete "don,t" and insert -- don't --, therefor.

In Column 22, Line 36, delete "1" and insert -- 11 --, therefor.

In Column 26, Line 4, in Claim 18, delete "The radio the method" and insert -- The method --, therefor.

Signed and Sealed this

Twenty-first Day of December, 2010

David J. Kappos
*Director of the United States Patent and Trademark Office*